United States Patent
Pan et al.

(10) Patent No.: US 10,205,630 B2
(45) Date of Patent: Feb. 12, 2019

(54) FAULT TOLERANCE METHOD FOR DISTRIBUTED STREAM PROCESSING SYSTEM

(71) Applicant: HUAWEI TECHNOLOGIES CO.,LTD., Shenzhen, Guangdong (CN)

(72) Inventors: Lujia Pan, Shenzhen (CN); Cheng He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 398 days.

(21) Appl. No.: 15/044,077

(22) Filed: Feb. 15, 2016

(65) Prior Publication Data

US 2016/0164719 A1 Jun. 9, 2016

Related U.S. Application Data

(63) Continuation of application No. PCT/CN2014/082991, filed on Jul. 25, 2014.

(30) Foreign Application Priority Data

Dec. 31, 2013 (CN) .......................... 2013 1 0754620

(51) Int. Cl.
*H04L 12/24* (2006.01)
*H04L 12/26* (2006.01)
(Continued)

(52) U.S. Cl.
CPC ........ *H04L 41/0677* (2013.01); *H04L 41/069* (2013.01); *H04L 41/0654* (2013.01);
(Continued)

(58) Field of Classification Search
CPC .................................................. H04L 41/0677
See application file for complete search history.

(56) References Cited

U.S. PATENT DOCUMENTS

| 6,430,150 B1 | 8/2002 | Azuma et al. |
| 7,870,425 B2 * | 1/2011 | Moore ................ G06F 11/0709 |
| | | 714/10 |

(Continued)

FOREIGN PATENT DOCUMENTS

| CN | 1541466 A | 10/2004 |
| CN | 1571417 A | 1/2005 |

(Continued)

*Primary Examiner* — Andrew C Georgandellis
(74) *Attorney, Agent, or Firm* — Huawei Technologies Co., Ltd.

(57) ABSTRACT

A fault tolerance method is provided for a distributed stream processing system. The method includes: obtaining, by a working node, information of a failed node, and receiving retransmission data sent by an upstream node, where the retransmission data is originally sent by a source node to the failed node; determining, according to the information of the failed node, whether the failed node is related to the working node; and if the failed node is related to the working node, processing the received retransmission data, and sending the processed retransmission data to a downstream node. In the present application, retransmission data sent by an upstream node is received by a working node, and after it is determined that a failed node is related to the working node, the received retransmission data is processed, so that the retransmission data sent by the upstream node is processed only when the failed node is related to the working node.

12 Claims, 6 Drawing Sheets

(51) Int. Cl.
*H04L 12/707* (2013.01)
*H04L 12/703* (2013.01)
*H04L 12/717* (2013.01)

(52) U.S. Cl.
CPC .......... *H04L 41/5035* (2013.01); *H04L 43/10* (2013.01); *H04L 45/22* (2013.01); *H04L 45/28* (2013.01); *H04L 45/42* (2013.01)

(56) References Cited

U.S. PATENT DOCUMENTS

| | | | |
|---|---|---|---|
| 9,317,359 B2* | 4/2016 | Vaananen | H04L 1/00 |
| 9,319,962 B2* | 4/2016 | Wetterwald | H04W 40/04 |
| 2002/0062388 A1 | 5/2002 | Ogier et al. | |
| 2004/0213148 A1 | 10/2004 | Willhite et al. | |
| 2005/0240677 A1 | 10/2005 | Liu et al. | |
| 2005/0243722 A1 | 11/2005 | Liu et al. | |
| 2006/0218301 A1 | 9/2006 | O'Toole et al. | |
| 2009/0089638 A1 | 4/2009 | Heise et al. | |
| 2009/0117927 A1* | 5/2009 | Li | H04L 65/1016 455/466 |
| 2012/0137164 A1* | 5/2012 | Uhlig | G06F 11/004 714/4.11 |
| 2012/0324285 A1 | 12/2012 | Li et al. | |
| 2013/0227055 A1 | 8/2013 | Vasseur et al. | |

FOREIGN PATENT DOCUMENTS

| | | |
|---|---|---|
| CN | 1965532 A | 5/2007 |
| CN | 101164056 A | 4/2008 |
| CN | 101355495 A | 1/2009 |
| CN | 101388831 A | 3/2009 |
| CN | 101409610 A | 4/2009 |
| CN | 101494565 A | 7/2009 |
| CN | 101635975 A | 1/2010 |
| CN | 101763321 A | 6/2010 |
| CN | 101777020 A | 7/2010 |
| CN | 101945050 A | 1/2011 |
| CN | 102833154 A | 12/2012 |
| CN | 103024047 A | 4/2013 |
| CN | 103049348 A | 4/2013 |
| WO | 03005629 A1 | 1/2003 |

* cited by examiner

FAULT TOLERANCE METHOD FOR DISTRIBUTED STREAM PROCESSING SYSTEM

CROSS-REFERENCE TO RELATED APPLICATION

This application is a continuation of International Application No. PCT/CN2014/082991, filed on Jul. 25, 2014, which claims priority to Chinese Patent Application No. 201310754620.X, filed on Dec. 31, 2013, both of the applications are hereby incorporated by reference in their entireties.

TECHNICAL FIELD

The present application relates to the field of computer technologies, and in particular, to a fault tolerance method for use in a distributed stream processing system.

BACKGROUND

Distributed computation technologies are continuously extending to various application areas. Distributed data stream processing systems have been widely used in many fields, such as financial management, network monitoring, communication data management, web applications, and sensor network data processing. A distributed stream processing system refers to a network software system that uses a distributed hardware system to process data stream services, and fault tolerance of the distributed stream processing system refers to a capability of providing a correct service for the external environment even when a fault occurs inside the system. A fault tolerance method for the distributed stream processing system is a main means for enhancing reliability and availability of the system. When some of working nodes inside the system fail, the system can automatically recover from the failure, and normal operation of an entire application system which relies on the distributed system is not severely affected.

Conventionally, the following fault tolerance methods are generally utilized in a distributed stream processing system:

(1) A distributed stream processing system uses centralized data backup, which is specifically that: data is backed up on a source node; after a stream processing network of the system is recovered, the source node resends a segment of data that was sent before the failure; and each working node in the system again receives and processes the data resent by the source node or each upstream working node.

(2) A distributed stream processing system uses distributed data backup, which is specifically that: each working node in the system backs up data that was processed during a previous time period; after a stream processing network of the system is recovered, each working node in the system resends the backup data to each downstream working node; each downstream working node again receives and processes the data resent by each upstream working node, and sends a data processing completion message to the upstream working node after successfully receiving the data resent by the upstream working node. The upstream working node deletes the backup data after receiving the data processing completion message from the downlink working node.

In the foregoing method (1), after the stream processing network of the system is recovered, the entire network of the system needs to be rolled back; the source node resends data, and every other working node again receives and processes the data resent by the source node or an upstream working node, which reduces data processing efficiency of the entire network, and wastes node resources. In the foregoing method (2), each working node needs to back up processed data, which results in large storage overheads. Besides, frequent interaction is required between an upstream working node and a downstream working node, which ultimately leads to low data processing efficiency.

SUMMARY

In order to solve the problems in the prior art, embodiments of the present application provide a fault tolerance method, node, and system for a distributed stream processing system. The technical solutions are as follows:

According to a first aspect, a fault tolerance method for a distributed stream processing system is provided, where the method includes:

obtaining node information of a failed node in a distributed stream processing system, and receiving retransmission data sent by an upstream node, where the retransmission data is originally sent by a source node, and the upstream node is the source node or an upstream working node;

determining, according to the node information of the failed node, whether the failed node is related to the working node; and if the failed node is related to the working node, processing the received retransmission data, and sending the processed retransmission data to a downstream node.

With reference to the first aspect, in a first possible implementation of the first aspect, the obtaining node information of a failed node in a distributed stream processing system includes:

receiving the node information of the failed node sent by a centralized management entity, where the centralized management entity is used for monitoring an operating status of each node in the distributed stream processing system.

With reference to the first aspect, in a second possible implementation of the first aspect, the determining, according to the node information of the failed node, whether the failed node is related to the working node includes:

querying a pre-stored node association table according to the node information of the failed node, where the node association table records node information of each node in the distributed stream processing system and a corresponding correlation degree to the working node; and determining, according to a result of the query, whether the failed node is related to the working node.

With reference to the first aspect, in a third possible implementation of the first aspect, the processing the received retransmission data includes:

obtaining pre-stored state information, where the pre-stored state information at least includes current node state information and data result information required for subsequent data processing; and processing the received retransmission data according to the pre-stored state information.

With reference to the third possible implementation of the first aspect, in a fourth possible implementation of the first aspect, after the processing the received retransmission data according to the pre-stored state information, the method further includes:

receiving a signal packet sent by the upstream node, where the signal packet carries a group identifier, and the group identifier is added by the source node to the signal packet after the source node groups and numbers inflowing data;

determining, according to the group identifier carried in the currently received signal packet, whether state information needs to be stored; and if state information needs to be stored, storing state information according to a processing result of the retransmission data.

With reference to the fourth possible implementation of the first aspect, in a fifth possible implementation of the first aspect, the determining, according to the group identifier carried in the currently received signal packet, whether state information needs to be stored includes:

obtaining a pre-stored group identifier, and determining a preset group identifier corresponding to the pre-stored group identifier, where the pre-stored group identifier is a group identifier carried in a previously received signal packet;

determining whether the group identifier carried in the currently received signal packet is the same as the preset group identifier corresponding to the pre-stored group identifier; and if the group identifier carried in the currently received signal packet is different from the preset group identifier corresponding to the pre-stored group identifier, determining that state information needs to be stored.

With reference to the third possible implementation of the first aspect, in a sixth possible implementation of the first aspect, the retransmission data sent by the upstream node carries a corresponding group identifier, where the group identifier is added by the source node to the retransmission data after the source node groups and numbers the retransmission data; and after the processing the received retransmission data according to the pre-stored state information, the method further includes:

determining, according to the group identifier carried in the retransmission data, whether state information needs to be stored; and if state information needs to be stored, storing state information according to a processing result of the retransmission data.

With reference to the sixth possible implementation of the first aspect, in a seventh possible implementation of the first aspect, the determining, according to the group identifier carried in the retransmission data, whether state information needs to be stored includes:

obtaining a pre-stored group identifier, and determining a preset group identifier corresponding to the pre-stored group identifier, where the pre-stored group identifier is a group identifier carried in previously received data;

determining whether the group identifier carried in the retransmission data is the same as the preset group identifier corresponding to the pre-stored group identifier; and if the group identifier carried in the retransmission data is different from the preset group identifier corresponding to the pre-stored group identifier, determining that state information needs to be stored.

With reference to the first aspect, in an eighth possible implementation of the first aspect, after the determining, according to the node information of the failed node, whether the failed node is related to the working node, the method further includes:

if the failed node is not related, skipping processing the received retransmission data.

With reference to the eighth possible implementation of the first aspect, in a ninth possible implementation of the first aspect, after the skipping processing the received retransmission data, the method further includes:

receiving other data sent by the upstream node, where the other data carries a corresponding group identifier, and the group identifier is added by the source node to the other data after the source node groups and numbers the other data;

obtaining a pre-stored group identifier, and determining a preset group identifier corresponding to the pre-stored group identifier, where the pre-stored group identifier is a group identifier carried in previously received data;

determining whether the group identifier carried in the other data is the same as the preset group identifier corresponding to the pre-stored group identifier; and if the group identifier carried in the other data is different from the preset group identifier corresponding to the pre-stored group identifier, processing the other data.

With reference to the ninth possible implementation of the first aspect, in a tenth possible implementation of the first aspect, after the processing the other data, the method further includes:

obtaining a pre-stored group identifier, and determining a preset group identifier corresponding to the pre-stored group identifier, where the pre-stored group identifier is a group identifier carried in previously received data;

determining whether the group identifier carried in the other data is the same as the preset group identifier corresponding to the pre-stored group identifier; and if the group identifier carried in the other data is different from the preset group identifier corresponding to the pre-stored group identifier, determining that state information needs to be stored, and storing state information according to a processing result of the other data.

With reference to the eighth possible implementation of the first aspect, in an eleventh possible implementation of the first aspect, after the skipping processing the received retransmission data, the method further includes:

receiving a signal packet sent by the upstream node, where the signal packet carries a group identifier, and the group identifier is added by the source node to the signal packet after the source node groups and numbers inflowing data;

obtaining a pre-stored group identifier, where the pre-stored group identifier is a group identifier carried in a previously received signal packet;

determining whether the group identifier carried in the currently received signal packet is the same as the pre-stored group identifier; and if the group identifier carried in the currently received signal packet is the same as the pre-stored group identifier, processing subsequent other data sent by the upstream node.

With reference to the eleventh possible implementation of the first aspect, in a twelfth possible implementation of the first aspect, after the processing subsequent other data sent by the upstream node, the method further includes:

obtaining a pre-stored group identifier, and determining a preset group identifier corresponding to the pre-stored group identifier, where the pre-stored group identifier is a group identifier carried in a previously received signal packet;

determining whether the group identifier carried in the currently received signal packet is the same as the preset group identifier corresponding to the pre-stored group identifier; and if the group identifier carried in the currently received signal packet is different from the preset group identifier corresponding to the pre-stored group identifier, determining that state information needs to be stored, and storing state information according to a processing result of the other data that is received before the currently received signal packet is received.

According to a second aspect, a fault tolerance method for a distributed stream processing system is provided, where the method includes:

obtaining node information of a failed node in a distributed stream processing system; and obtaining temporarily stored data according to the node information of the failed node, and sending the temporarily stored data as retransmission data to a downstream node, so that the downstream node determines, according to whether the downstream node is related to the failed node, whether to process the retransmission data.

With reference to the second aspect, in a first possible implementation of the second aspect, the obtaining node information of a failed node in the distributed stream processing system includes:

receiving the node information of the failed node sent by a centralized management entity, where the centralized management entity is used for monitoring an operating status of each node in the distributed stream processing system.

With reference to the second aspect, in a second possible implementation of the second aspect, after the sending the temporarily stored data as retransmission data to a downstream node, the method further includes:

adding, to a signal packet, a group identifier corresponding to the retransmission data, and sending the signal packet carrying the group identifier to the downstream node.

With reference to the second aspect, in a third possible implementation of the second aspect, the sending the temporarily stored data as retransmission data to a downstream node includes:

using the temporarily stored data as retransmission data, adding, to the retransmission data, a group identifier corresponding to the retransmission data, and sending the retransmission data carrying the group identifier to the downstream node.

With reference to the second or third possible implementation of the second aspect, in a fourth possible implementation of the second aspect, before the sending the temporarily stored data as retransmission data to a downstream node, the method further includes:

grouping and numbering received data according to a time interval for receiving data or a data size, to obtain a group identifier corresponding to each piece of data.

According to a third aspect, a working node is provided, where the working node includes:

a first obtaining module, configured to obtain node information of a failed node in a distributed stream processing system;

a first receiving module, configured to receive retransmission data sent by an upstream node, where the retransmission data is originally sent by a source node, and the upstream node is the source node or an upstream working node;

a first determining module, configured to determine, according to the node information of the failed node, whether the working node is related to the failed node; and a first processing module, configured to: when the working node is related to the failed node, process the received retransmission data, and send the processed retransmission data to a downstream node.

With reference to the third aspect, in a first possible implementation of the third aspect, the first obtaining module is configured to receive the node information of the failed node sent by a centralized management entity, where the centralized management entity is used for monitoring an operating status of each node in the distributed stream processing system.

With reference to the third aspect, in a second possible implementation of the third aspect, the first determining module includes:

a query unit, configured to query a pre-stored node association table according to the node information of the failed node, where the node association table records node information of each node in the distributed stream processing system and a corresponding correlation degree to the working node; and a determining unit, configured to determine, according to a result of the query, whether the working node is related to the failed node.

With reference to the third aspect, in a third possible implementation of the third aspect, the first processing module includes:

an obtaining unit, configured to obtain pre-stored state information, where the pre-stored state information at least includes current node state information and data result information required for subsequent data processing; and a processing unit, configured to process the received retransmission data according to the pre-stored state information.

With reference to the third possible implementation of the third aspect, in a fourth possible implementation of the third aspect, the working node further includes:

a second receiving module, configured to receive a signal packet sent by the upstream node, where the signal packet carries a group identifier, and the group identifier is added by the source node to the signal packet after the source node groups and numbers inflowing data;

a second determining module, configured to determine, according to the group identifier carried in the currently received signal packet, whether state information needs to be stored; and a first storage module, configured to: when state information needs to be stored, store state information according to a processing result of the retransmission data.

With reference to the fourth possible implementation of the third aspect, in a fifth possible implementation of the third aspect, the second determining module includes:

an obtaining unit, configured to obtain a pre-stored group identifier;

a first determining unit, configured to determine a preset group identifier corresponding to the pre-stored group identifier, where the pre-stored group identifier is a group identifier carried in a previously received signal packet;

a judging unit, configured to determine whether the group identifier carried in the currently received signal packet is the same as the preset group identifier corresponding to the pre-stored group identifier; and a second determining unit, configured to: when the group identifier carried in the currently received signal packet is different from the preset group identifier corresponding to the pre-stored group identifier, determine that state information needs to be stored.

With reference to the third possible implementation of the third aspect, in a sixth possible implementation of the third aspect, the working node further includes:

a third determining module, configured to: when the retransmission data sent by the upstream node carries a corresponding group identifier, determine, according to the group identifier carried in the retransmission data, whether state information needs to be stored, where the group identifier is added by the source node to the retransmission data after the source node groups and numbers the retransmission data; and a second storage module, configured to: when state information needs to be stored, store state information according to a processing result of the retransmission data.

With reference to the sixth possible implementation of the third aspect, in a seventh possible implementation of the third aspect, the third determining module includes:

an obtaining unit, configured to obtain a pre-stored group identifier;

a first determining unit, configured to determine a preset group identifier corresponding to the pre-stored group identifier, where the pre-stored group identifier is a group identifier carried in previously received data;

a judging unit, configured to determine whether the group identifier carried in the retransmission data is the same as the preset group identifier corresponding to the pre-stored group identifier; and a second determining unit, configured to: when the group identifier carried in the retransmission data is different from the preset group identifier corresponding to the pre-stored group identifier, determine that state information needs to be stored.

With reference to the third aspect, in an eighth possible implementation of the third aspect, the working node further includes:

a fourth determining module, configured to: when it is determined that the working node is not related to the failed node, skip processing the received retransmission data.

With reference to the eighth possible implementation of the third aspect, in a ninth possible implementation of the third aspect, the working node further includes:

a third receiving module, configured to receive other data sent by the upstream node, where the other data carries a corresponding group identifier, and the group identifier is added by the source node to the other data after the source node groups and numbers the other data;

a second obtaining module, configured to obtain a pre-stored group identifier;

a fifth determining module, configured to determine a preset group identifier corresponding to the pre-stored group identifier, where the pre-stored group identifier is a group identifier carried in previously received data;

a first judging module, configured to determine whether the group identifier carried in the other data is the same as the preset group identifier corresponding to the pre-stored group identifier; and a second processing module, configured to: when the group identifier carried in the other data is different from the preset group identifier corresponding to the pre-stored group identifier, process the other data.

With reference to the ninth possible implementation of the third aspect, in a tenth possible implementation of the third aspect, the working node further includes:

a third obtaining module, configured to obtain a pre-stored group identifier;

a sixth determining module, configured to determine a preset group identifier corresponding to the pre-stored group identifier, where the pre-stored group identifier is a group identifier carried in previously received data;

a second judging module, configured to determine whether the group identifier carried in the other data is the same as the preset group identifier corresponding to the pre-stored group identifier;

a seventh determining module, configured to: when the group identifier carried in the other data is different from the preset group identifier corresponding to the pre-stored group identifier, determine that state information needs to be stored; and a third storage module, configured to store state information according to a processing result of the other data.

With reference to the eighth possible implementation of the third aspect, in an eleventh possible implementation of the third aspect, the working node further includes:

a fourth receiving module, configured to receive a signal packet sent by the upstream node, where the signal packet carries a group identifier, and the group identifier is added by the source node to the signal packet after the source node groups and numbers inflowing data;

a fourth obtaining module, configured to obtain a pre-stored group identifier, where the pre-stored group identifier is a group identifier carried in a previously received signal packet;

a third judging module, configured to determine whether the group identifier carried in the currently received signal packet is the same as the pre-stored group identifier; and a third processing module, configured to: when the group identifier carried in the currently received signal packet is the same as the pre-stored group identifier, process subsequent other data sent by the upstream node.

With reference to the eleventh possible implementation of the third aspect, in a twelfth possible implementation of the third aspect, the working node further includes:

a fifth obtaining module, configured to obtain a pre-stored group identifier;

an eighth determining module, configured to determine a preset group identifier corresponding to the pre-stored group identifier, where the pre-stored group identifier is a group identifier carried in a previously received signal packet;

a fourth judging module, configured to determine whether the group identifier carried in the currently received signal packet is the same as the preset group identifier corresponding to the pre-stored group identifier;

a ninth determining module, configured to: when the group identifier carried in the currently received signal packet is different from the preset group identifier corresponding to the pre-stored group identifier, determine that state information needs to be stored; and a fourth storage module, configured to store state information according to a processing result of the other data that is received before the currently received signal packet is received.

According to a forth aspect, a source node is provided, where the source node includes:

a first obtaining module, configured to obtain node information of a failed node in a distributed stream processing system;

a second obtaining module, configured to obtain temporarily stored data according to the node information of the failed node; and a sending module, configured to send the temporarily stored data as retransmission data to a downstream node, so that the downstream node determines, according to whether the downstream node is related to the failed node, whether to process the retransmission data.

With reference to the fourth aspect, in a first possible implementation of the fourth aspect, the first obtaining module is configured to receive the node information of the failed node sent by a centralized management entity, where the centralized management entity is used for monitoring an operating status of each node in the distributed stream processing system.

With reference to the fourth aspect, in a second possible implementation of the fourth aspect, the sending module includes:

a first adding unit, configured to add, to a signal packet, a group identifier corresponding to the retransmission data; and a first sending unit, configured to send the signal packet carrying the group identifier to a downstream node.

With reference to the fourth aspect, in a third possible implementation of the fourth aspect, the sending module includes:

a second adding unit, configured to use the temporarily stored data as retransmission data, and add, to the retransmission data, a group identifier corresponding to the retransmission data; and a second sending unit, configured to send the retransmission data carrying the group identifier to a downstream node.

With reference to the second or third possible implementation of the fourth aspect, in a fourth possible implementation of the fourth aspect, the source node further includes:

a grouping and numbering module, configured to group and number received data according to a time interval for receiving data or a data size, to obtain a group identifier corresponding to each piece of data.

According to a fifth aspect, a fault tolerance system for a distributed stream processing system is provided, where the system includes a source node and multiple working nodes, where the working node is the node provided by the foregoing third aspect, and the source node is the source node provided by the foregoing fourth aspect.

Beneficial effects brought by the technical solutions of the embodiments of the present application include:

retransmission data sent by an upstream node is received by a working node, and after it is determined that a failed node is related to the working node, the received retransmission data is processed, so that the retransmission data sent by the upstream node is processed only when the failed node is related to the working node. Therefore, data processing efficiency of other nodes is not affected, and it is unnecessary to store a large amount of backup data locally, so that local resources are saved. Besides, because frequent interaction with another upstream or downstream node is not required, data processing efficiency is improved.

DESCRIPTION OF EMBODIMENTS

To make the objectives, technical solutions, and advantages of the present application clearer, the following further describes the embodiments of the present application in detail with reference to the accompanying drawings.

Figure 1:
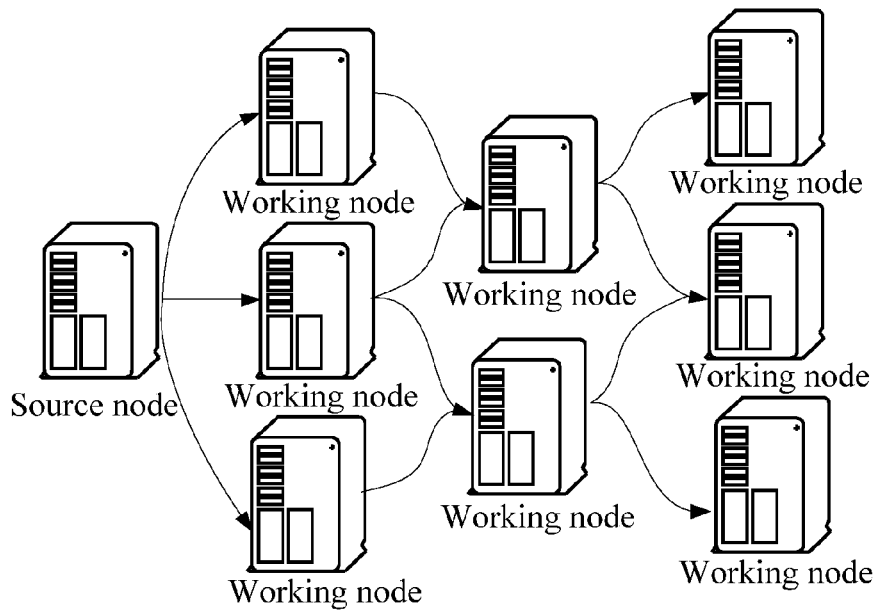
FIG. 1 is a schematic diagram illustrating an implementation environment of a fault tolerance method for a distributed stream processing system according to an embodiment of the present application.
Figure 2:
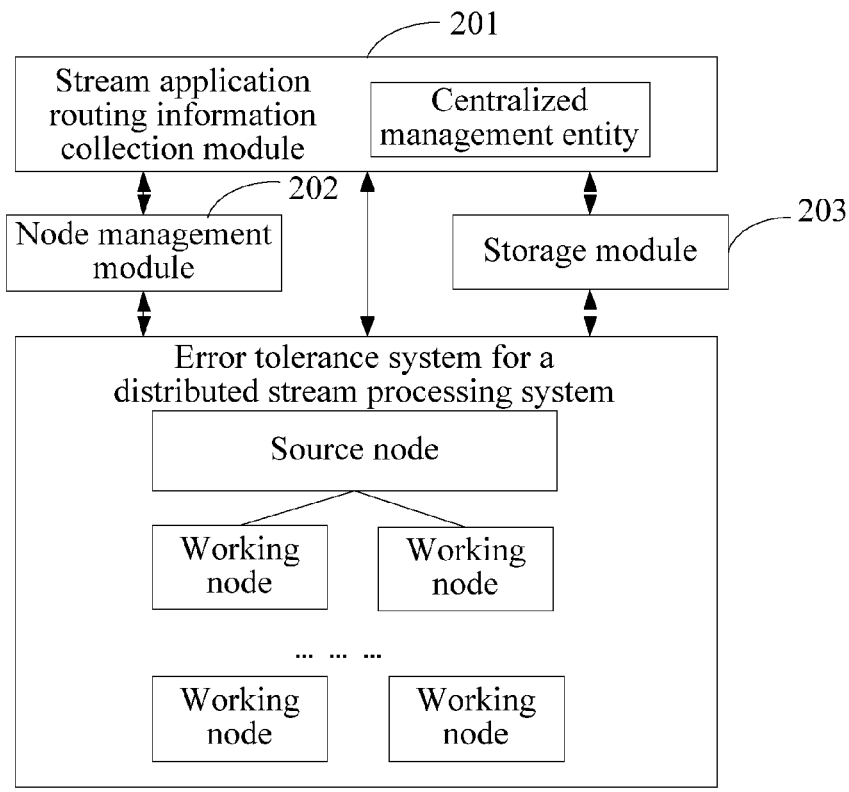
FIG. 2 is a schematic structural diagram of a fault tolerance system for a distributed stream processing system according to another embodiment of the present application.

FIG. 1 shows a schematic structure of an implementation environment suitable for a fault tolerance method according to an embodiment of the present application. The implementation environment is a distributed stream processing system, which includes a source node and plurality of working nodes. Specifically, as shown in FIG. 2, in order to ensure normal running of the distributed stream processing system, a stream application routing information collection module 201, a node management module 202, and a storage module 203 are configured in the distributed stream processing system of FIG. 1. These modules may be hardware, or software running on an appropriate hardware platform.

Figure 3:
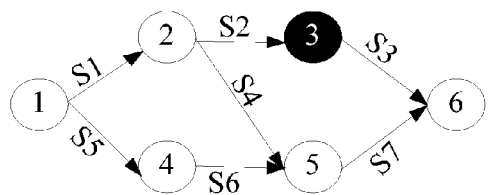
FIG. 3 is a schematic illustration of a stream processing network topology routing table of a distributed stream processing system according to another embodiment of the present application.

The stream application routing information collection module 201 includes a centralized management entity. The centralized management entity monitors operating status of each working node and the source node in the distributed stream processing system. Because assignment of corresponding working nodes and link relationships between working nodes are involved when a distributed stream processing system loads an application, the centralized management entity stores a stream processing network topology routing table corresponding to the distributed stream processing system. FIG. 3 shows a schematic structure of the stream processing network topology routing table. Each working node in the distributed stream processing system receives and processes data, which flows from the source node, according to the stream processing network topology routing table.

Besides, the centralized management entity also stores a backup node table, where the backup node table stores a backup node of each working node in the system. When a working node in the distributed stream processing system fails, the centralized management entity may control a backup node to replace the failed node, thereby ensuring that a processing network of the distributed stream processing system can recover quickly. Backup nodes may be initialized by the centralized management entity, and subsequently may be dynamically adjusted according to a load balancing policy and a scheduling policy of the system.

With reference to FIG. 1, the node management module 202 is configured to manage the source node and each working node in the distributed stream processing system shown in FIG. 1. The source node is a node through which data flows into the distributed stream processing system, and the working nodes are all the other nodes except the source node in the distributed stream processing system. In the embodiments of the present application, the source node in the distributed stream processing system shown in FIG. 1 backs up processed data, and each working node and the source node save their state information in real time.

In the embodiments of the present application, during normal operation of the distributed stream processing system, the source node groups inflowing data, and assigns a group identifier to each group of inflowing data. The source node periodically performs data backup according to criteria such as time interval and data block size, and then sends, to a downstream node, data which is grouped and assigned a group identifier. Each working node receives data sent by the source node or an upstream working node, and periodically stores state information according to identifier information of the data, where the state information at least includes current state information of the node and data result information that is required in subsequent data processing. After a working node in the distributed stream processing system fails, the source node uses temporarily stored backup data as retransmission data, and sends the retransmission data to a downstream node. A working node, that is related to the failed node, processes the retransmitted data. Besides, to ensure that the centralized management entity can monitor operating status of each working node and the source node in the system in real time, each working node and the source node regularly report heartbeat information to the centralized management entity, to inform the centralized management entity of their operating status.

The storage module 203 is configured to store all information related to fault tolerance, including the stream processing network topology routing table, the backup node table, state information of each working node and the source node, and the like. Implementation of the storage module 203 may be in the following two forms: one is a single storage entity, that is, all information related to the fault tolerance is stored in a node in a centralized manner; another is distributed storage entities, and this storage manner is a shared storage manner in which multiple nodes cooperate with each other. Besides, a storage medium for use as the storage module 203 is not limited in the embodiments of the present application, and the storage medium may be a hard disk, and may also be a memory unit, or the like.

Figure 4:
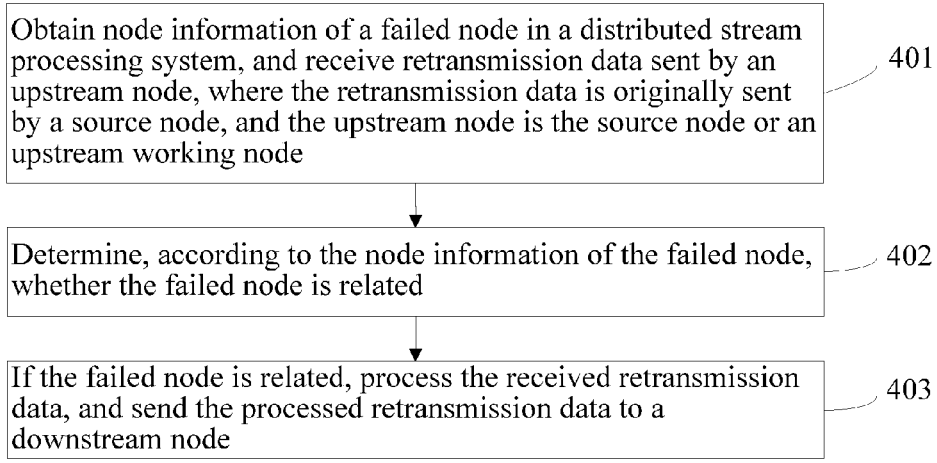
FIG. 4 is a flowchart of a fault tolerance method for a distributed stream processing system according to an embodiment of the present application.

An embodiment of the present application provides a fault tolerance method for a distributed stream processing system, executed by a working node other than a source node in the distributed stream processing system. Referring to FIG. 4, the method provided by this embodiment of the present application includes:

401: Obtain information of a failed node in the distributed stream processing system, and receive retransmission data sent by an upstream node, where the retransmission data is originally sent by a source node to the failed node, and the upstream node is the source node or an upstream working node.

402: Determine, according to the information of the failed node, whether the failed node is related to the working node.

403: If the failed node is related to the working node, process the received retransmission data, and send the processed retransmission data to a downstream node.

Optionally, the obtaining node information of a failed node in a distributed stream processing system includes:
receiving the node information of the failed node sent by a centralized management entity, where the centralized management entity is used for monitoring an operating status of each node in the distributed stream processing system.

Optionally, the determining, according to the node information of the failed node, whether the failed node is related to the working node includes:
querying a pre-stored node association table according to the node information of the failed node, where the node association table records node information of each node in the distributed stream processing system and a corresponding correlation degree to the working node; and
determining, according to a result of the query, whether the failed node is related to the working node.

Optionally, the processing the received retransmission data includes:
obtaining pre-stored state information, where the pre-stored state information at least includes current node state information and data result information required for subsequent data processing; and
processing the received retransmission data according to the pre-stored state information.

Optionally, after the processing the received retransmission data according to the pre-stored state information, the method further includes:
receiving a signal packet sent by the upstream node, where the signal packet carries a group identifier, and the group identifier is added by the source node to the signal packet after the source node groups and numbers inflowing data;
determining, according to the group identifier carried in the currently received signal packet, whether state information needs to be stored; and
if state information needs to be stored, storing state information according to a processing result of the retransmission data.

Optionally, the determining, according to the group identifier carried in the currently received signal packet, whether state information needs to be stored includes:
obtaining a pre-stored group identifier, and determining a preset group identifier corresponding to the pre-stored group identifier, where the pre-stored group identifier is a group identifier carried in a previously received signal packet;
determining whether the group identifier carried in the currently received signal packet is the same as the preset group identifier corresponding to the pre-stored group identifier; and
if the group identifier carried in the currently received signal packet is different from the preset group identifier corresponding to the pre-stored group identifier, determining that state information needs to be stored.

Optionally, the retransmission data sent by the upstream node carries a corresponding group identifier, where the group identifier is added by the source node to the retransmission data after the source node groups and numbers the retransmission data; and
after the processing the received retransmission data according to the pre-stored state information, the method further includes:
determining, according to the group identifier carried in the retransmission data, whether state information needs to be stored; and
if state information needs to be stored, storing state information according to a processing result of the retransmission data.

Optionally, the determining, according to the group identifier carried in the retransmission data, whether state information needs to be stored includes:
obtaining a pre-stored group identifier, and determining a preset group identifier corresponding to the pre-stored group identifier, where the pre-stored group identifier is a group identifier carried in previously received data;

determining whether the group identifier carried in the retransmission data is the same as the preset group identifier corresponding to the pre-stored group identifier; and if the group identifier carried in the retransmission data is different from the preset group identifier corresponding to the pre-stored group identifier, determining that state information needs to be stored.

Optionally, after the determining, according to the node information of the failed node, whether the failed node is related to the working node, the method further includes:

if the failed node is not related, skipping processing the received retransmission data.

Optionally, after the skipping processing the received retransmission data, the method further includes:

receiving other data sent by the upstream node, where the other data carries a corresponding group identifier, and the group identifier is added by the source node to the other data after the source node groups and numbers the other data;

obtaining a pre-stored group identifier, and determining a preset group identifier corresponding to the pre-stored group identifier, where the pre-stored group identifier is a group identifier carried in previously received data;

determining whether the group identifier carried in the other data is the same as the preset group identifier corresponding to the pre-stored group identifier; and if the group identifier carried in the other data is different from the preset group identifier corresponding to the pre-stored group identifier, processing the other data.

Optionally, after the processing the other data, the method further includes:

obtaining a pre-stored group identifier, and determining a preset group identifier corresponding to the pre-stored group identifier, where the pre-stored group identifier is a group identifier carried in previously received data;

determining whether the group identifier carried in the other data is the same as the preset group identifier corresponding to the pre-stored group identifier; and if the group identifier carried in the other data is different from the preset group identifier corresponding to the pre-stored group identifier, determining that state information needs to be stored, and storing state information according to a processing result of the other data.

Optionally, after the skipping processing the received retransmission data, the method further includes:

receiving a signal packet sent by the upstream node, where the signal packet carries a group identifier, and the group identifier is added by the source node to the signal packet after the source node groups and numbers inflowing data;

obtaining a pre-stored group identifier, where the pre-stored group identifier is a group identifier carried in a previously received signal packet;

determining whether the group identifier carried in the currently received signal packet is the same as the pre-stored group identifier; and if the group identifier carried in the currently received signal packet is the same as the pre-stored group identifier, processing subsequent other data sent by the upstream node.

Optionally, after the processing subsequent other data sent by the upstream node, the method further includes:

obtaining a pre-stored group identifier, and determining a preset group identifier corresponding to the pre-stored group identifier, where the pre-stored group identifier is a group identifier carried in a previously received signal packet;

determining whether the group identifier carried in the currently received signal packet is the same as the preset group identifier corresponding to the pre-stored group identifier; and if the group identifier carried in the currently received signal packet is different from the preset group identifier corresponding to the pre-stored group identifier, determining that state information needs to be stored, and storing state information according to a processing result of the other data that is received before the currently received signal packet is received.

In the method provided by this embodiment of the present application, retransmission data sent by an upstream node is received by a working node, and after it is determined that a failed node is related to the working node, the received retransmission data is processed. In this way, the retransmission data sent by the upstream node is processed only when the failed node is related to the working node. Therefore, data processing efficiency of other nodes is not affected, and it is unnecessary to store a large amount of backup data locally, so that local resources are saved. Besides, because frequent interaction with another upstream or downstream node is not required, data processing efficiency is improved.

Figure 5:
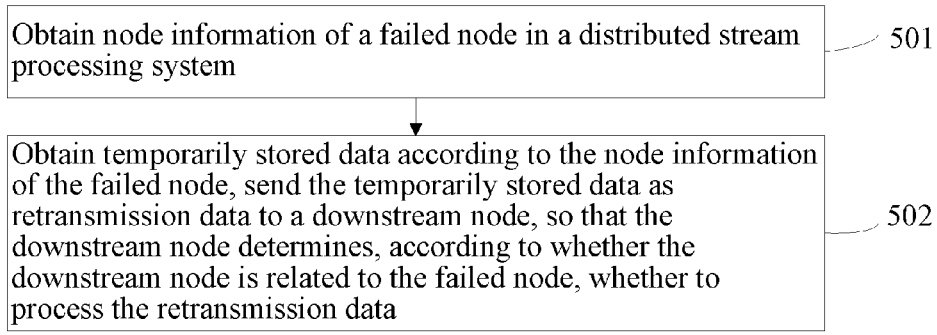
FIG. 5 is a flowchart of a fault tolerance method for a distributed stream processing system according to another embodiment of the present application.

With reference to the schematic diagram of the implementation environment shown in FIG. 1, the schematic structural diagram of a fault tolerance system for a distributed stream processing system shown in FIG. 2, and the foregoing embodiment shown in FIG. 4, an embodiment of the present application provides a fault tolerance method for a distributed stream processing system. In the example of this embodiment, a source node in a distributed stream processing system executes the fault tolerance method for a distributed stream processing system provided by this embodiment of the present application. Referring to FIG. 5, the method provided by this embodiment of the present application includes:

501: Obtain node information of a failed node in a distributed stream processing system.

502: Obtain temporarily stored data according to the node information of the failed node, send the temporarily stored data as retransmission data to a downstream node, so that the downstream node determines, according to whether the downstream node is related to the failed node, whether to process the retransmission data.

Optionally, the obtaining node information of a failed node in a distributed stream processing system includes:

receiving the node information of the failed node sent by a centralized management entity, where the centralized management entity is used for monitoring an operating status of each node in the distributed stream processing system.

Optionally, after the sending the temporarily stored data as retransmission data to a downstream node, the method further includes:

adding, to a signal packet, a group identifier corresponding to the retransmission data, and sending the signal packet carrying the group identifier to the downstream node.

Optionally, the sending the temporarily stored data as retransmission data to a downstream node includes:

using the temporarily stored data as retransmission data, adding, to the retransmission data, a group identifier corresponding to the retransmission data, and sending the retransmission data carrying the group identifier to the downstream node.

Optionally, before the sending the temporarily stored data as retransmission data to a downstream node, the method further includes:

grouping and numbering received data according to a time interval for receiving data or a data size, to obtain a group identifier corresponding to each piece of data.

In the method provided by this embodiment of the present application, retransmission data sent by an upstream node is received by a working node, and after it is determined that a failed node is related to the working node, the received retransmission data is processed, so that the retransmission data sent by the upstream node is processed only when the failed node is related to the working node. Therefore, data processing efficiency of other nodes is not affected, and it is unnecessary to store a large amount of backup data locally, so that local resources are saved. Besides, because frequent interaction with another upstream or downstream node is not required, data processing efficiency is improved.

With reference to the schematic diagram of the implementation environment shown in FIG. 1, the schematic structural diagram of a distributed stream processing system shown in FIG. 2, and the content of the embodiment shown in FIG. 4 or FIG. 5, an embodiment of the present application provides a fault tolerance method for a distributed stream processing system. For ease of description, in this embodiment of the present application, an example is used to explain in detail the method provided by this embodiment of the present application. In this example, a source node sends retransmission data after a working node in the distributed stream processing system fails, and the source node adds, to a signal packet, a group identifier corresponding to the retransmission data and sends the signal packet to a downstream node, so that the downstream node, after receiving the signal packet, stores state information according to the group identifier carried in the signal packet is used as.

Figure 6:
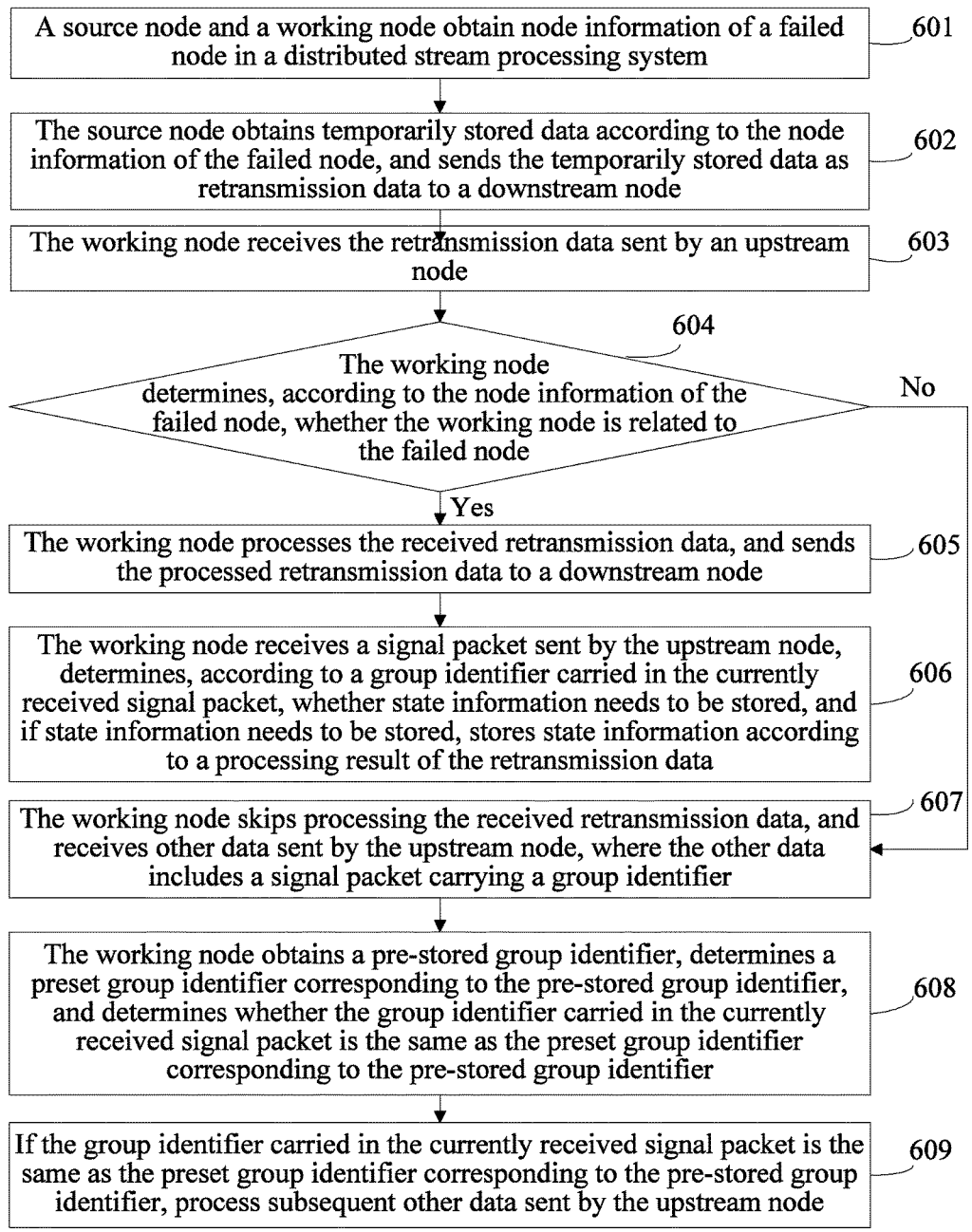
FIG. 6 is a flowchart of a fault tolerance method for a distributed stream processing system according to yet another embodiment of the present application.

Referring to FIG. 6, the method provided by this embodiment of the present application includes:

601: A source node and a working node obtain node information of a failed node in a distributed stream processing system.

The source node and the working node may obtain the node information of the failed node in the distributed stream node processing system in multiple manners. Because a centralized management entity in the distributed stream processing system can monitor an operating status of each node in the distributed stream processing system, and each node needs to regularly report heartbeat information to the centralized management entity, the centralized management entity may obtain node information of a failed node in the distributed stream processing system in real time according to the heartbeat information reported by each node, and may broadcast the node information of the failed node to the source node and each working node in the distributed stream processing system after obtaining the node information of the failed node. Therefore, the source node and the working node may obtain the node information of the failed node in the distributed stream processing system by receiving the node information of the failed node broadcast by the centralized management entity. Apparently, the source node and the working node may also obtain the node information of the failed node in the distributed stream processing system in another manner, which is not specifically limited in this embodiment of the present application.

602: The source node obtains temporarily stored data according to the node information of the failed node, and sends the temporarily stored data as retransmission data to a downstream node.

In a distributed stream processing system, after a node fails, the distributed stream processing system may take some measures to restore the system to normal running, thereby avoiding affecting normal data processing by the system. In order to ensure that no error, which is caused by omission of data processing at any working node, occurs in a data processing procedure during a period from when the failed node fails until when the system is recovered, the source node, after the system restores normal running, needs to obtain temporarily stored data according to the node information of the failed node, and sends the temporarily stored data as retransmission data to a downstream node. The manner in which the source node obtains temporarily stored data according to the node information of the failed node by the source node and the manner for sending the temporarily stored data as retransmission data to a downstream node are not specifically limited in this embodiment of the present application.

The distributed stream processing system may take many measures to restore the system to normal running. For example, the centralized management entity in the system may control a backup node of the failed node to replace the failed node to continue data processing; or a function of the failed node may be transferred to another working node, and data processing is continued after a stream processing network topology routing table of the system is refreshed; or data processing may be continued after the failed node restarts.

Optionally, in order to facilitate management of the retransmission data when the retransmission data is sent, and in order that the downstream node can subsequently store state information according to a group to which the retransmission data sent by the source node belongs, before the sending, by the source node, the temporarily stored data as retransmission data to a downstream node, the method further includes: grouping and numbering received data according to a time interval for receiving data and a data size, to obtain a group identifier corresponding to each piece of data. The received data is all data flowing into the source node. In order that the downstream node can easily distinguish which group of retransmission data sent by the source node is the received retransmission data, after the sending, by the source node, the temporarily stored data as retransmission data to a downstream node, the method further includes: adding, to a signal packet, a group identifier corresponding to the retransmission data, and sending the signal packet carrying the group identifier to the downstream node. Specifically, each time after sending a group of retransmission data, the source node further sends a signal packet carrying a group identifier of the group of retransmission data to the downstream node. Therefore, after receiving the signal packet, the downstream node may obtain, according to the group identifier carried in the signal packet, the group identifier of the retransmission data that is received during a previous time period. Besides, before the temporarily stored data is sent as retransmission data to the downstream node, in order that the downstream node knows clearly which group of retransmission data is to be received, the source node may first send a signal packet carrying a group identifier of a group of data prior to the to-be-sent retransmission data. The manner in which the source node adds a group identifier corresponding to the retransmission data to a signal packet and the manner for sending the signal packet carrying the group identifier to the downstream node are not specifically limited in this embodiment of the present application.

A specific method for grouping and numbering received data according to a time interval for receiving data or a data size by the source node is not specifically limited in this embodiment of the present application. During a specific implementation, in the event received data is grouped and numbered according to a time interval, the source node may set a fixed time interval, and categorizes data received within each fixed time interval as a group. For example, the source node may set 10 min (minutes) as a fixed time interval. When data is received, data received within the first 10 min is categorized as a first group, and data received from the $10^{th}$ min to the $20^{th}$ min is categorized as a second group, and so on. In the event received data is grouped and numbered according to a data size, the source node may set a size of data included in each group of data before receiving data, for example, the source node may set that each group of data includes 10 pieces of data. Therefore, when data is received, each piece of received data may be numbered, and pieces of data numbered 1 to 10 are categorized as the first group, and the rest can be deduced by analogy. For example, first 100 pieces of received data may be separately numbered 1 to 100, and then pieces of data numbered 1 to 10 are categorized as the first group, and pieces of data numbered 11 to 20 are categorized as the second group, and so on. Apparently, the source node may also group and number received data in another manner, which is not specifically limited in this embodiment of the present application.

603: The working node receives the retransmission data sent by an upstream node.

After the source node sends the retransmission data, the working node receives the retransmission data sent by an upstream node. A manner for receiving the retransmission data sent by an upstream node by the working node is not specifically limited in this embodiment of the present application. Besides, if the source node groups the retransmission data and assigns a group identifier to each piece of retransmission data when sending the retransmission data, and sends a signal packet carrying a group identifier of the group of retransmission data after each group of retransmission data is sent, the working node also receives the signal packet sent by the source node after receiving the retransmission data sent by the source node.

It should be noted that if the working node is a first-level node under the source node, the upstream node of the working node is the source node; if the working node is a second-level node under the source node or a node of another level under the second level, the upstream node is a working node that is indicated in the stream processing network topology routing table as an upper-level node of the working node. The stream processing network topology routing table shown in FIG. 3 is used as an example. If the working node is node 2, the upstream node of the working node is the source node; if the working node is node 3, the upstream node of the working node is node 2.

604: The working node determines, according to the node information of the failed node, whether the working node is related to the failed node, and if the working node is related to the failed node, perform step 605; and if the working node is not related to the failed node, perform step 607.

According to the method provided by this embodiment of the present application, after a failed node appears in the distributed stream processing system, a working node related to the failed node needs to process again retransmission data sent by the source node, and a working node not related to the failed node does not need to process again the retransmission data sent by the source node. For this reason, after receiving retransmission data sent by an upstream node, a working node needs to determine, according to the node information of the failed node, whether the working node is related to the failed node. Specifically, in the distributed stream processing system, when the failed node is a first-level downstream node of the working node or a downstream node which is multiple levels away from the working node, the working node determines that the working node is related to the failed node; otherwise, the working node determines that the working node is not related to the failed node.

There may be many manners for determining, by the working node according to the node information of the failed node, whether the working node is related to the failed node, which include but are not limited to the following manner during a specific implementation:

The working node queries a pre-stored node association table according to the node information of the failed node, and determines, according to a result of the query, whether the working node is related to the failed node. The node association table records node information of the working node and other nodes in the distributed stream processing system and a corresponding correlation degree to the working node. For ease of description, the node association table is described with reference to the stream processing network topology routing table shown in FIG. 3. In FIG. 3, a node numbered 1 is the source node, and nodes 2 to 6 are other working nodes. Table 1 shows a node association table, which is obtained according to the stream processing network topology routing table shown in FIG. 3, and describes correlations between working node 2 and other nodes in the distributed stream processing system. In Table 1, a correlation degree being 0 indicates that a node corresponding to a node number is not related to working node 2, a correlation degree being 1 indicates that a working node corresponding to a node number is related to working node 2, N/A indicates that a node corresponding to a node number is not in a topology relationship with working node 2, and a stream number indicates a data flow direction between a node corresponding to a node number and working node 2. For example, it can be known from the stream processing network topology routing table shown in FIG. 3 that a data flow direction between working node 2 and a node corresponding to the node number 3 is S2, and no data flow direction exists between working node 2 and a node corresponding to the node number 4; therefore, a stream number between working node 2 and the node corresponding to the node number 4 is N/A.

TABLE 1

| Node number | Correlation degree | Stream number |
| --- | --- | --- |
| 1 | 0 | N/A |
| 3 | 1 | S2 |
| 4 | 0 | N/A |
| 5 | 1 | S4 |
| 6 | 1 | S2 |

As shown in Table 1, when the failed node is a node with the node number 3, it can be known from Table 1 that, because a correlation degree between working node 2 and the node with the node number 3 is 1, it is determined that working node 2 is related to the failed node; when the failed node is a node with the node number 4, because a correlation degree between the working node 2 and the node with the node number 4 is 0, it is determined that working node 2 is not related to the failed node.

Apparently, the working node may use another manner to determine whether the working node is related to the failed node. For example, the determining may also be implemented by extracting, from the stream processing network topology routing table, information about whether the working node is related to the failed node. If the determining is implemented by extracting, from the stream processing network topology routing table, information about whether the working node is related to the failed node, a node that extracts, from the stream processing network topology routing table, information about whether the working node is related to the failed node may be the working node, or another working node may extract node information about whether the working node is related to the failed node and then send the node information to the working node, which is not specifically limited in this embodiment of the present application.

605: The working node processes the received retransmission data, and sends the processed retransmission data to a downstream node.

After it is determined through step 604 that the working node is related to the failed node, the working node needs to process the received retransmission data, and send the processed retransmission data to a downstream node after the processing is completed. A manner for processing the received retransmission data by the working node and a manner for sending the processed retransmission data to a downstream node are not specifically limited in this embodiment of the present application.

In the distributed stream processing system, each working node obtains a data processing result when processing data. Therefore, when sending retransmission data to a downstream node, each working node also sends a data processing result to the downstream node, so that the downstream node can continue data processing according to the data processing result. Besides, when processing data, each working node also needs to continue data processing based on a data processing result sent by an upstream node. In this embodiment of the present application, in order to ensure that retransmission data can be processed conveniently and quickly, each working node may store state information in real time, where the state information includes but is not limited to current node state information of each working node and data result information required for subsequent data processing. Specifically, each time after receiving a group of data, each working node may store state information once, to ensure that processing of retransmission data can be continued subsequently based on previously stored state information. Therefore, when processing the received retransmission data, the working node may first obtain pre-stored state information, and processes the received retransmission data according to the pre-stored state information. Current node state information included in the state information includes but is not limited to node configuration information of a connected upstream node and downstream node and the working node.

When obtaining the pre-stored state information, the working node needs to take into consideration a group to which the currently received retransmission data belongs and a group to which latest data processed by the working node belongs. For example, if the source node first resends the third group of retransmission data, retransmission data first received by the working node is the third group. Then, if the latest data processed by the working node is the fifth group, the working node needs to go back to a processing result of the second group of data because the third group of retransmission data needs to be processed based on the second group of data that is already processed. Therefore, pre-stored state information corresponding to the second group of data needs to be obtained.

In order to facilitate explanation and description of the foregoing processing performed by the working node on the received retransmission data according to the pre-stored state information, a specific example is used in the following to describe the foregoing process. Specifically, if each piece of retransmission data sent by the source node includes a different number of count units, a task of each node is to count the total number of count units included in data, and each node may add up the numbers of count units or cut the number of count units when processing count units included in data. In this case, when processing the received retransmission data, the working node needs to perform counting based on the number of count units counted by the upstream node. In this embodiment of the present application, in order to facilitate statistical counting of data processing results of the working node, each time the working node processes some data, the working node stores state information once, and when processing retransmission data subsequently, the working node may continue to process the retransmission data based on data result information that is required for subsequent data processing and is included in the state information corresponding to the data that is already processed. For example, each time the working node processes a group of retransmission data, the working node may store state information once, and when processing a next group of retransmission data, the working node continues data processing based on the stored state information corresponding to the previous group of retransmission data. Therefore, when processing the retransmission data, the working node may obtain the counted number of count units in stored state information corresponding to a previous group of data, and continue to process the retransmission data based on the counted number of the count units.

606: The working node receives a signal packet sent by the upstream node, determines, according to a group identifier carried in the currently received signal packet, whether state information needs to be stored, and if state information needs to be stored, stores state information according to a processing result of the retransmission data; and the process ends.

This step to step 609 are optional steps. Because state information at least includes current node state information and data result information required for subsequent data processing, the working node may store state information in real time, to ensure that the node can normally process subsequent retransmission data. Besides, if the working node stores state information corresponding to each piece of received retransmission data, many resources of the working node are wasted. In the method provided by this embodiment of the present application, state information can be stored according to grouping of retransmission data by the source node, and each time a group of retransmission data is processed, state information is stored once. In this embodiment, the source node indicates, by sending a signal packet carrying a group identifier to a downstream node, a group to which retransmission data belongs. Then, the working node may receive the signal packet sent by the upstream node, and determine, according to a group identifier carried in the currently received signal packet, whether state information needs to be stored. There may be many manners for determining, by the working node according to a group identifier carried in the currently received signal packet, whether state information needs to be stored, which include but are not limited to the following manner during a specific implementation:

obtaining a pre-stored group identifier, and determining a preset group identifier corresponding to the pre-stored group identifier, where the pre-stored group identifier is a group identifier carried in a previously received signal packet; determining whether the group identifier carried in the currently received signal packet is the same as the preset group identifier corresponding to the pre-stored group identifier; and if the group identifier carried in the currently received signal packet is different from the preset group identifier corresponding to the pre-stored group identifier, determining that state information needs to be stored, where the pre-stored group identifier is used for indicating latest data already processed by the working node. For example, if the working node already processes the fourth group of data currently, the pre-stored group identifier is 4. Besides, the preset group identifier corresponding to the pre-stored group identifier includes but is not limited to a next group identifier corresponding to the pre-stored group identifier. For example, the pre-stored group identifier is 1, and if a next group identifier corresponding to the group identifier 1 is 2, the preset group identifier corresponding to the pre-stored group identifier 1 is the group identifier 2.

In order to facilitate description of the foregoing determining, by the working node according to a group identifier carried in the currently received signal packet, whether state information needs to be stored, an example is given below.

For example, the pre-stored group identifier obtained by the working node is the group identifier 4, and the preset group identifier corresponding to the pre-stored group identifier is a next group identifier corresponding to the pre-stored group identifier, in this example, the determined preset group identifier corresponding to the pre-stored group identifier is 5. In this case, if the group identifier carried in the signal packet currently received by the working node is 2, it indicates that the working node currently receives the second group of retransmission data. Because the group identifier carried in the currently received signal packet is different from the preset group identifier 5 corresponding to the pre-stored group identifier, in order to facilitate storing of a processing result of the second group of retransmission data that is already received, the working node needs to store state information in this case, so that processing of subsequently received retransmission data can be continued based on the processing result of the second group of retransmission data.

607: The working node skips processing the received retransmission data, and receives other data sent by the upstream node, where the other data includes a signal packet carrying a group identifier.

If determining that the working node is not related to the failed node, the working node skips processing the retransmission data, so as to save node sources of the working node. Besides, in order to save storage space of the working node, the working node may discard the received retransmission data.

Because data continuously flows into the source node, besides sending retransmission data within a period from when a node in the system fails until when the system restoration is completed, the source node also needs to send other inflowing data, and the other inflowing data is also grouped and assigned a group identifier. In this embodiment of the present application, before sending other data, the source node also uses a manner of grouping and numbering the other received data and adding, to a signal packet, a group identifier corresponding to the other data; that is, each time after the source node sends a group of other data, the source node sends a signal packet used for indicating a group identifier of the group of other data, so that the downstream node knows clearly the group to which the next other data belongs.

608: The working node obtains a pre-stored group identifier, determines a preset group identifier corresponding to the pre-stored group identifier, and determines whether the group identifier carried in the currently received signal packet is the same as the preset group identifier corresponding to the pre-stored group identifier.

In order to ensure data is not processed repeatedly or its processing is omitted, the working node needs to obtain a pre-stored group identifier, and determine a preset group identifier corresponding to the pre-stored group identifier. In this step, the preset group identifier corresponding to the pre-stored group identifier may also be a next group identifier corresponding to the pre-stored group identifier. After determining the preset group identifier corresponding to the pre-stored group identifier, the working node determines, by determining whether the group identifier carried in the currently received signal packet is the same as the preset group identifier corresponding to the pre-stored group identifier, whether to process other data that is received subsequently. For details, refer to step 609.

609: If the group identifier carried in the currently received signal packet is the same as the preset group identifier corresponding to the pre-stored group identifier, process subsequent other data sent by the upstream node.

With reference to the previous step, if the group identifier carried in the currently received signal packet is the same as the preset group identifier corresponding to the pre-stored group identifier, it indicates that the working node will subsequently receive a next group of other data, which is sent by the upstream node and not yet processed, based on the other data that is already processed. Therefore, the working node processes the subsequent other data sent by the upstream node.

For example, when the pre-stored group identifier obtained by the working node is 3, it indicates that the working node already processes the third group of data. Then, if the preset group identifier corresponding to the pre-stored group identifier is a next group identifier corresponding to the pre-stored group identifier, the determined preset group identifier corresponding to the pre-stored group identifier is 4. If the group identifier carried in the signal packet currently received by the working node is 4, it indicates that the upstream node already sends the fourth group of other data and will send the fifth group of other data. Therefore, the working node will process the subsequent fifth group of other data sent by the upstream node.

A manner for processing, by the working node, the other data sent by the upstream node is the same as the manner for processing the retransmission data by the working node. For details, refer to the manner for processing the retransmission data by the working node in step 605, which is not described repeatedly herein.

Optionally, after the processing subsequent other data sent by the upstream node, in order to store, in real time, state information of the other data processed subsequently, the method may further include: obtaining a pre-stored group identifier, determining a preset group identifier corresponding to the pre-stored group identifier, where the pre-stored group identifier is a group identifier carried in a previously received signal packet; determining whether the group identifier carried in the currently received signal packet is the same as the preset group identifier corresponding to the pre-stored group identifier; and if the group identifier carried in the currently received signal packet is different from the preset group identifier corresponding to the pre-stored group identifier, determining that state information needs to be stored, and storing state information according to a processing result of the other data that is received before the currently received signal packet is received.

The method for determining, by the working node, whether to store state information corresponding to the subsequently processed other data and the principle for storing state information corresponding to the subsequent other data are the same as the principles for determining, by the working node, whether to store state information corresponding to the retransmission data and storing state information corresponding to the retransmission data in step 606. For details, refer to the foregoing content in step 606, which is not described repeatedly herein.

In the method provided by this embodiment of the present application, retransmission data sent by an upstream node is received by a working node, and after it is determined that a failed node is related to the working node, the received retransmission data is processed. In this way, the retransmission data sent by the upstream node is processed only when the failed node is related to the working node. Therefore, data processing efficiency of other nodes is not affected, and it is unnecessary to store a large amount of backup data locally, so that local resources are saved. Besides, because frequent interaction with another upstream or downstream node is not required, data processing efficiency is improved.

With reference to the schematic diagram of the implementation environment shown in FIG. 1, the schematic structural diagram of a distributed stream processing system shown in FIG. 2, and the content of the embodiments shown in FIG. 4 to FIG. 6, an embodiment of the present application provides a fault tolerance method for a distributed stream processing system. For ease of description, in this embodiment of the present application, an example is used to explain in detail the method provided by this embodiment of the present application. In this example, after a working node in the distributed stream processing system fails, the source node groups and numbers retransmission data and directly adds a group number to each piece of retransmission data to be sent, so that after receiving retransmission data carrying a group number, a downstream node can store state information according to the group number carried in the retransmission data.

Figure 7:
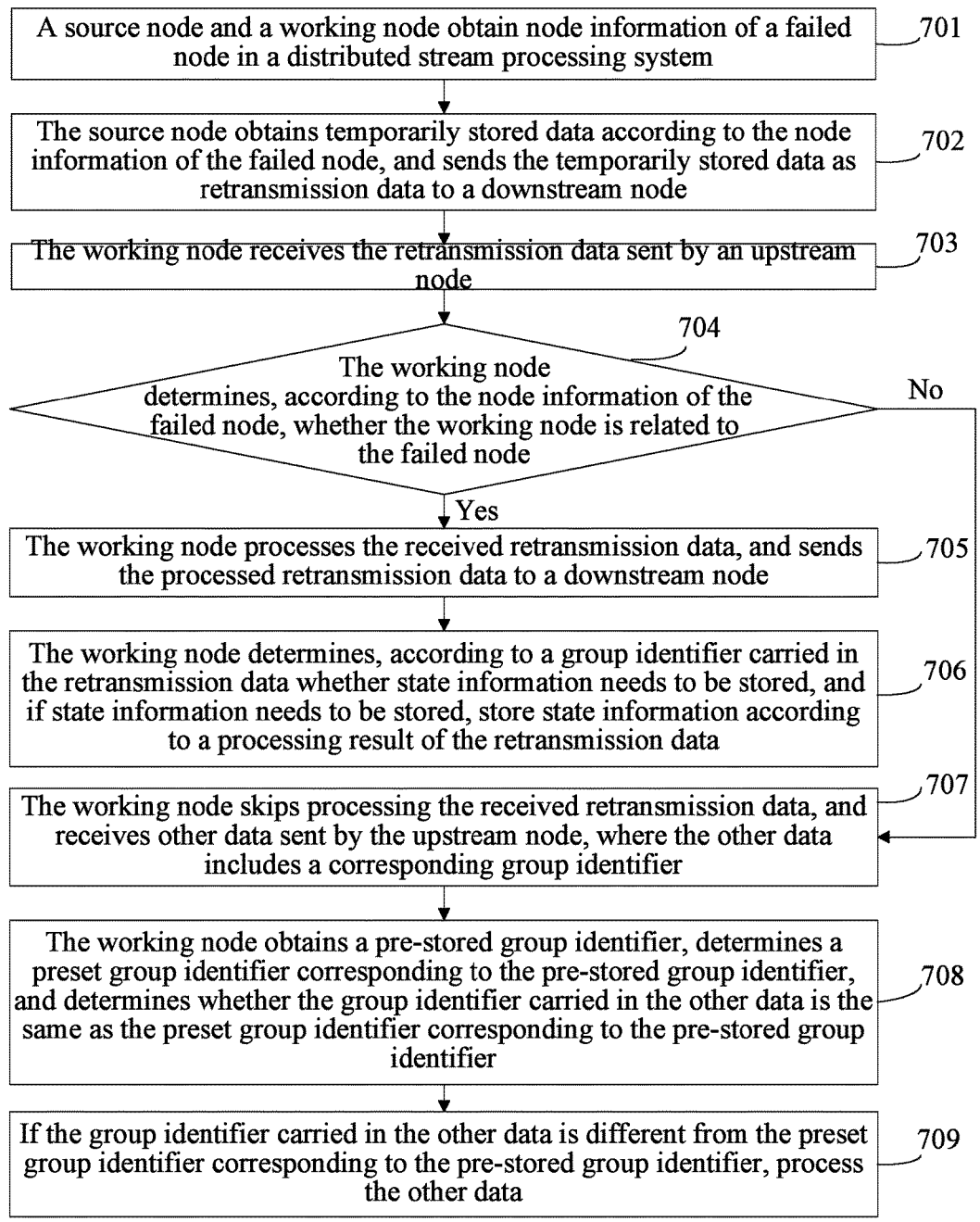
FIG. 7 is a flowchart of a fault tolerance method for a distributed stream processing system according to still another embodiment of the present application.

Referring to FIG. 7, the method provided by this embodiment of the present application includes:

701: A source node and a working node obtain node information of a failed node in a distributed stream processing system.

A principle of this step is the same as the principle of step 601 in the foregoing Embodiment. For details, refer to step 601 in the foregoing Embodiment, which is not described repeatedly herein.

702: The source node obtains temporarily stored data according to the node information of the failed node, and sends the temporarily stored data as retransmission data to a downstream node.

A principle of this step is the same as the principle of step 602 in the foregoing Embodiment. For details, refer to step 602 in the foregoing Embodiment, which is not described repeatedly herein.

It should be noted that in this embodiment of the present application, when sending the temporarily stored data as retransmission data to a downstream node, the source node uses the temporarily stored data as retransmission data, adds, to the retransmission data, a group identifier corresponding to the retransmission data, and sends the retransmission data carrying the group identifier to the downstream node.

Specifically, after grouping retransmission data, the source node directly adds a group identifier to each piece of retransmission data that is to be sent. Therefore, when receiving each piece of retransmission data sent by an upstream node, a downstream node may obtain, from the group identifier carried in the retransmission data, a group number corresponding to the retransmission data.

703: The working node receives the retransmission data sent by an upstream node.

A principle of this step is the same as the principle of step 603 in the foregoing Embodiment. For details, refer to step 603 in the foregoing Embodiment, which is not described repeatedly herein.

704: The working node determines, according to the node information of the failed node, whether the working node is related to the failed node, and if the working node is related to the failed node, perform step 705; and if the working node is not related to the failed node, perform step 707.

A principle of this step is the same as the principle of step 604 in the foregoing Embodiment. For details, refer to step 604 in the foregoing Embodiment, which is not described repeatedly herein.

705: The working node processes the received retransmission data, and sends the processed retransmission data to a downstream node.

A principle of this step is the same as the principle of step 605 in the foregoing Embodiment. For details, refer to step 605 in the foregoing Embodiment, which is not described repeatedly herein.

706: The working node determines, according to a group identifier carried in the retransmission data, whether state information needs to be stored, and if state information needs to be stored, store state information according to a processing result of the retransmission data; and this process ends.

Specifically, when the source node adds a group number to each piece of retransmission data after grouping and numbering the retransmission data, the retransmission data sent by the upstream node carries a corresponding group identifier, and the determining, by the working node according to a group identifier carried in the retransmission data, whether state information needs to be stored includes:

obtaining a pre-stored group identifier, and determining a preset group identifier corresponding to the pre-stored group identifier; determining whether the group identifier carried in the retransmission data is the same as the preset group identifier corresponding to the pre-stored group identifier; and if the group identifier carried in the retransmission data is different from the preset group identifier corresponding to the pre-stored group identifier, determining that state information needs to be stored.

For example, when the pre-stored group identifier obtained by the working node is 3, it indicates that the working node already processes the third group of data. Besides, if the preset group identifier corresponding to the pre-stored group identifier is a next group identifier corresponding to the pre-stored group identifier, the preset group identifier corresponding to the pre-stored group identifier is 4. Then, if the group identifier carried in the retransmission data is 2, it indicates that the currently received retransmission data is the second group. Because the group identifier 2 carried in the retransmission data is different from the preset group identifier corresponding to the pre-stored group identifier, in order to store a state corresponding to the second group of retransmission data that is processed, the working node needs to store state information, where the state information includes current node state information and data result information required for processing subsequent retransmission data.

707: The working node skips processing the received retransmission data, and receives other data sent by the upstream node, where the other data includes a corresponding group identifier.

If determining that the working node is not related to the failed node, the working node skips processing the retransmission data, so as to save node sources of the working node. Besides, in order to save storage space of the working node, the working node may discard the received retransmission data.

Because data continuously flows into the source node, the source node also needs to send other inflowing data, besides sending retransmission data within a period from when a node in the system fails until when the system restoration is completed. In this embodiment of the present application, when sending other data, the source node directly adds a group identifier of the other data to the other data and sends the other data to a downstream node. Therefore, after receiving the other data sent by the upstream node, the working node may directly obtain a group number of the other data from the other data.

708: The working node obtains a pre-stored group identifier, determines a preset group identifier corresponding to the pre-stored group identifier, and determines whether the group identifier carried in the other data is the same as the preset group identifier corresponding to the pre-stored group identifier.

A principle of this step is the same as the principle of step 608 in the foregoing Embodiment. For details, refer to step 608 in the foregoing Embodiment, which is not described repeatedly herein.

709: If the group identifier carried in the other data is different from the preset group identifier corresponding to the pre-stored group identifier, process the other data.

With reference to the previous step, if the group identifier carried in the other data that is received currently is different from the preset group identifier corresponding to the pre-stored group identifier, it indicates that the working node has not yet processed the other data. Therefore, the working node processes the other data sent by the upstream node.

For example, when the obtained pre-stored group identifier is 3, it indicates that the working node has already processed the third group of other data previously. If the preset group identifier corresponding to the pre-stored group identifier is a next group identifier corresponding to the pre-stored group identifier, the preset group identifier corresponding to the pre-stored group identifier is 4. If the group identifier carried in the other data currently received by the working node is 5, it indicates that the other data received at this time is the fifth group of other data sent by the upstream node. In this case, because the working node learns, according to the obtained pre-stored group identifier, that the previously processed group is the third group of other data, the working node processes the fifth group of other data sent by the upstream node.

The manner for processing, by the working node, the other data sent by the upstream node is the same as the manner for processing the retransmission data by the working node. For details, refer to the manner for processing the retransmission data by the working node in step 705, which is not described repeatedly herein.

Optionally, after the processing the other data, in order to store state information corresponding to the other data in real time, the method may further include: obtaining a pre-stored group identifier, and determining a preset group identifier corresponding to the pre-stored group identifier, where the pre-stored group identifier is a group identifier carried in previously received data; determining whether the group identifier carried in the other data is the same as the preset group identifier corresponding to the pre-stored group identifier; and if the group identifier carried in the other data is different from the preset group identifier corresponding to the pre-stored group identifier, determining that state information needs to be stored, and storing state information according to a processing result of the other data.

The method for determining, by the working node, whether to store state information corresponding to the other processed data and the principle for storing state information corresponding to the other data are the same as the method for determining, by the working node, whether to store state information corresponding to the retransmission data and the principle for storing state information corresponding to the retransmission data in step 706. For details, refer to the foregoing content in step 706, which is not described repeatedly herein.

In the method provided by this embodiment of the present application, retransmission data sent by an upstream node is received by a working node, and after it is determined that a failed node is related to the working node, the received retransmission data is processed, so that the retransmission data sent by the upstream node is processed only when the failed node is related to the working node. Therefore, data processing efficiency of other nodes is not affected, and it is unnecessary to store a large amount of backup data locally, so that local resources are saved. Besides, because frequent interaction with another upstream or downstream node is not required, data processing efficiency is improved.

Figure 8:
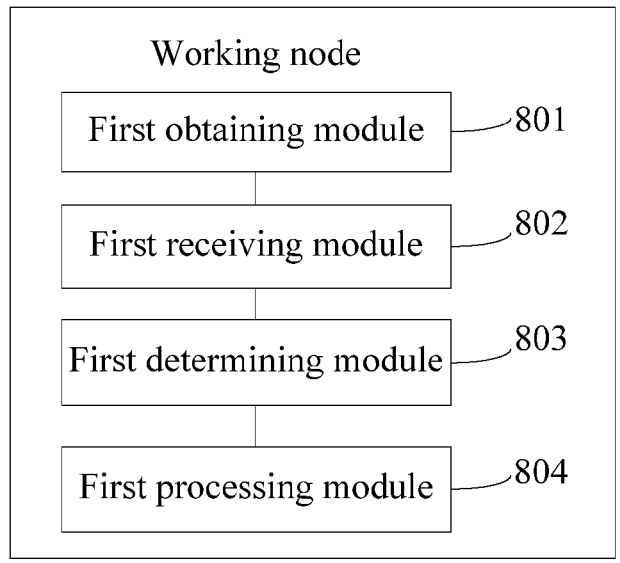
FIG. 8 is a functional block diagram of a working node according to an embodiment of the present application.

FIG. 8 shows a schematic diagram of a working node according to another embodiment of the present application. The working node is used for executing the functions of the working node in any of the embodiments shown in FIG. 4 to FIG. 7. Referring to FIG. 8, the working node includes:

a first obtaining module 801, configured to obtain node information of a failed node in a distributed stream processing system;

a first receiving module 802, configured to receive retransmission data sent by an upstream node, where the retransmission data is originally sent by a source node, and the upstream node is the source node or an upstream working node;

a first determining module 803, configured to determine, according to the node information of the failed node, whether the working node is related to the failed node; and a first processing module 804, configured to: when the working node is related to the failed node, process the received retransmission data, and send the processed retransmission data to a downstream node.

Optionally, the first obtaining module 801 is configured to receive the node information of the failed node sent by a centralized management entity, where the centralized management entity is used for monitoring an operating status of each node in the distributed stream processing system.

Optionally, the first determining module 803 includes:

a query unit, configured to query a pre-stored node association table according to the node information of the failed node, where the node association table records node information of each node in the distributed stream processing system and a corresponding correlation degree; and a determining unit, configured to determine, according to a result of the query, whether the working node is related to the failed node.

Optionally, the first processing module 804 includes:

an obtaining unit, configured to obtain pre-stored state information, where the pre-stored state information at least includes current node state information and data result information required for subsequent data processing; and a processing unit, configured to process the received retransmission data according to the pre-stored state information.

Optionally, the working node further includes:

a second receiving module, configured to receive a signal packet sent by the upstream node, where the signal packet carries a group identifier, and the group identifier is added by the source node to the signal packet after the source node groups and numbers inflowing data;

a second determining module, configured to determine, according to the group identifier carried in the currently received signal packet, whether state information needs to be stored; and a first storage module, configured to: when state information needs to be stored, store state information according to a processing result of the retransmission data.

Optionally, the second determining module includes:

an obtaining unit, configured to obtain a pre-stored group identifier;

a first determining unit, configured to determine a preset group identifier corresponding to the pre-stored group identifier, where the pre-stored group identifier is a group identifier carried in a previously received signal packet;

a judging unit, configured to determine whether the group identifier carried in the currently received signal packet is the same as the preset group identifier corresponding to the pre-stored group identifier; and a second determining unit, configured to: when the group identifier carried in the currently received signal packet is different from the preset group identifier corresponding to the pre-stored group identifier, determine that state information needs to be stored.

Optionally, the working node further includes:

a third determining module, configured to: when the retransmission data sent by the upstream node carries a corresponding group identifier, determine, according to the group identifier carried in the retransmission data, whether state information needs to be stored, where the group identifier is added by the source node to the retransmission data after the source node groups and numbers the retransmission data; and a second storage module, configured to: when state information needs to be stored, store state information according to a processing result of the retransmission data.

Optionally, the third determining module includes:

an obtaining unit, configured to obtain a pre-stored group identifier;

a first determining unit, configured to determine a preset group identifier corresponding to the pre-stored group identifier, where the pre-stored group identifier is a group identifier carried in previously received data;

a judging unit, configured to determine whether the group identifier carried in the retransmission data is the same as the preset group identifier corresponding to the pre-stored group identifier; and a second determining unit, configured to: when the group identifier carried in the retransmission data is different from the preset group identifier corresponding to the pre-stored group identifier, determine that state information needs to be stored.

Optionally, the working node further includes:

a fourth determining module, configured to: when it is determined that the working node is not related to the failed node, skip processing the received retransmission data.

Optionally, the working node further includes:

a third receiving module, configured to receive other data sent by the upstream node, where the other data carries a corresponding group identifier, and the group identifier is added by the source node to the other data after the source node groups and numbers the other data;

a second obtaining module, configured to obtain a pre-stored group identifier;

a fifth determining unit, configured to determine a preset group identifier corresponding to the pre-stored group identifier, where the pre-stored group identifier is a group identifier carried in previously received data;

a first judging module, configured to determine whether the group identifier carried in the other data is the same as the preset group identifier corresponding to the pre-stored group identifier; and a second processing module, configured to: when the group identifier carried in the other data is different from the preset group identifier corresponding to the pre-stored group identifier, process the other data.

Optionally, the working node further includes:

a third obtaining module, configured to obtain a pre-stored group identifier;

a sixth determining module, configured to determine a preset group identifier corresponding to the pre-stored group identifier, where the pre-stored group identifier is a group identifier carried in previously received data;

a second judging module, configured to determine whether the group identifier carried in the other data is the same as the preset group identifier corresponding to the pre-stored group identifier;

a seventh determining module, configured to: when the group identifier carried in the other data is different from the preset group identifier corresponding to the pre-stored group identifier, determine that state information needs to be stored; and a third storage module, configured to store state information according to a processing result of the other data.

Optionally, the working node further includes:

a fourth receiving module, configured to receive a signal packet sent by the upstream node, where the signal packet carries a group identifier, and the group identifier is added by the source node to the signal packet after the source node groups and numbers inflowing data;

a fourth obtaining module, configured to obtain a pre-stored group identifier, where the pre-stored group identifier is a group identifier carried in a previously received signal packet;

a third judging module, configured to determine whether the group identifier carried in the currently received signal packet is the same as the pre-stored group identifier; and a third processing module, configured to: when the group identifier carried in the currently received signal packet is the same as the pre-stored group identifier, process subsequent other data sent by the upstream node.

Optionally, the working node further includes:

a fifth obtaining module, configured to obtain a pre-stored group identifier;

an eighth determining module, configured to determine a preset group identifier corresponding to the pre-stored group identifier, where the pre-stored group identifier is a group identifier carried in a previously received signal packet;

a fourth judging module, configured to determine whether the group identifier carried in the currently received signal packet is the same as the preset group identifier corresponding to the pre-stored group identifier;

a tenth determining module, configured to: when the group identifier carried in the currently received signal packet is different from the preset group identifier corresponding to the pre-stored group identifier, determine that state information needs to be stored; and a fourth storage module, configured to store state information according to a processing result of the other data that is received before the currently received signal packet is received.

The working node provided by this embodiment of the present application receives retransmission data sent by an upstream node, and processes the received retransmission data after determining that the working node is related to a failed node. In this way, the retransmission data sent by the upstream node is processed only when the working node is related to the failed node. Therefore, data processing efficiency of other nodes is not affected, and it is unnecessary to store a large amount of backup data locally, so that local resources are saved. Besides, because frequent interaction with another upstream or downstream node is not required, data processing efficiency is improved.

Figure 9:
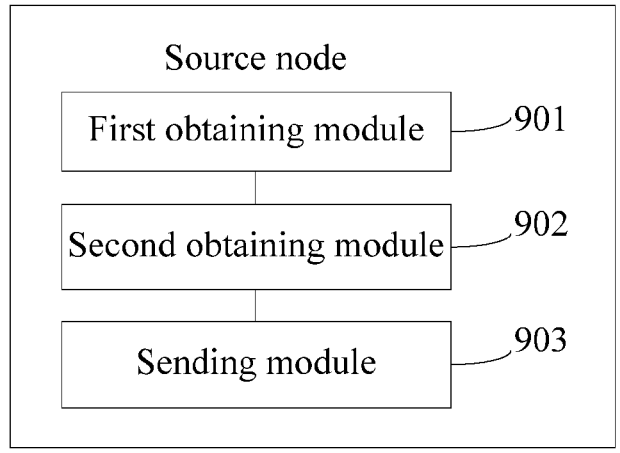
FIG. 9 is a functional block diagram of a source node according to an embodiment of the present application.

FIG. 9 shows a schematic structural diagram of a source node according to another embodiment of the present application. The source node is used for executing the functions of the source node in any of the embodiments shown in FIG. 4 to FIG. 7. Referring to FIG. 9, the source node includes:

a first obtaining module 901, configured to obtain node information of a failed node in a distributed stream processing system;

a second obtaining module 902, configured to obtain temporarily stored data according to the node information of the failed node; and a sending module 903, configured to send the temporarily stored data as retransmission data to a downstream node, so that the downstream node determines, according to whether the downstream node is related to the failed node, whether to process the retransmission data.

Optionally, the first obtaining module 901 is configured to receive the node information of the failed node sent by a centralized management entity, where the centralized management entity is used for monitoring an operating status of each node in the distributed stream processing system.

Optionally, the sending module 903 includes:

a first adding unit, configured to add, to a signal packet, a group identifier corresponding to the retransmission data; and a first sending unit, configured to send the signal packet carrying the group identifier to a downstream node.

Optionally, the sending module 903 includes:

a second adding unit, configured to use the temporarily stored data as retransmission data, and add, to the retransmission data, a group identifier corresponding to the retransmission data; and a second sending unit, configured to send the retransmission data carrying the group identifier to a downstream node.

Optionally, the source node further includes:

a grouping and numbering module, configured to group and number received data according to a time interval for receiving data or a data size, to obtain a group identifier corresponding to each piece of data.

The source node provided by this embodiment of the present application obtains temporarily stored data according to node information of a failed node, and sends the temporarily stored data as retransmission data to a downstream working node, so that a working node receives the retransmission data sent by an upstream node, and processes the received retransmission data after determining that the working node is related to the failed node. In this way, the retransmission data sent by the upstream node is processed only when the working node is related to the failed node. Therefore, data processing efficiency of other nodes is not affected, and it is unnecessary to store a large amount of backup data locally, so that local resources are saved. Besides, because frequent interaction with another upstream or downstream node is not required, data processing efficiency is improved.

Figure 10:
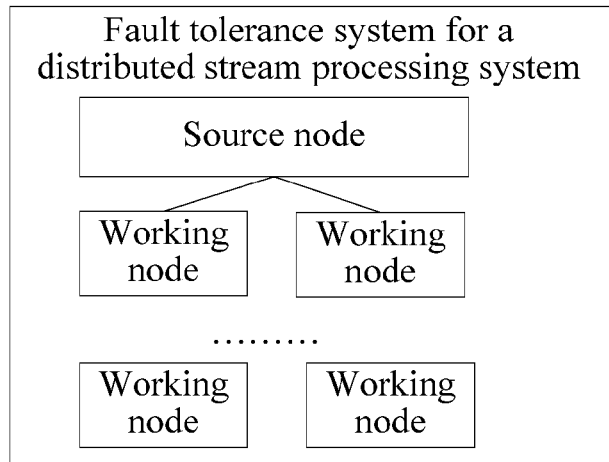
FIG. 10 is a schematic block diagram of a fault tolerance system for a distributed stream processing system according to an embodiment of the present application.

FIG. 10 shows a fault tolerance system for distributed stream processing according to another embodiment of the present application. Referring to FIG. 10, the system includes: a source node and multiple working nodes.

Any one of the working nodes in the system is the working node in any of the embodiments shown in FIG. 4 to FIG. 7. For details, refer to the content of the embodiments shown in FIG. 4 to FIG. 7, which is not described repeatedly herein.

The source node is the source node in any of the embodiments shown in FIG. 4 to FIG. 7. For details, refer to the content of the embodiments shown in FIG. 4 to FIG. 7, which is not described repeatedly herein.

In the system provided by this embodiment of the present application, retransmission data sent by an upstream node is received by a working node, and after it is determined that a failed node is related to the working node, the received retransmission data is processed. In this way, the retransmission data sent by the upstream node is processed only when the failed node is related to the working node. Therefore, data processing efficiency of other nodes is not affected, and it is unnecessary to store a large amount of backup data locally, so that local resources are saved. Besides, because frequent interaction with another upstream or downstream node is not required, data processing efficiency is improved.

Figure 11:
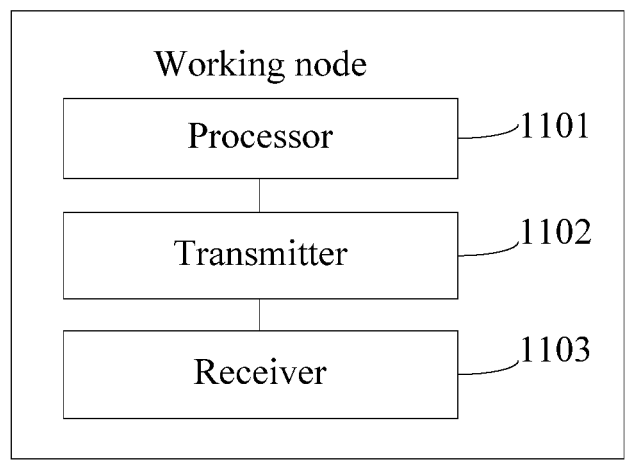
FIG. 11 is a simplified structural diagram of a working node according to an embodiment of the present application.

FIG. 11 shows a schematic structural diagram of a working node according to another embodiment of the present application. The working node is used for executing the functions of the working node in any of the embodiments shown in FIG. 4 to FIG. 7. Referring to FIG. 11, the working node includes at least one processor 1101, transmitter 1102, and receiver 1103.

The processor 1101 is configured to obtain node information of a failed node in a distributed stream processing system;

the receiver 1103 is configured to receive retransmission data sent by an upstream node, where the retransmission data is originally sent by a source node, and the upstream node is the source node or an upstream working node;

the processor 1101 is further configured to determine, according to the node information of the failed node, whether the working node is related to the failed node; and when the working node is related to the failed node, process the received retransmission data; and the transmitter 1102 is configured to send the processed retransmission data to a downstream node.

Optionally, the receiver 1103 is further configured to receive the node information of the failed node sent by a centralized management entity, where the centralized management entity is used for monitoring an operating status of each node in the distributed stream processing system.

Optionally, the processor 1101 is further configured to query a pre-stored node association table according to the node information of the failed node, where the node association table records node information of each node in the distributed stream processing system and a corresponding correlation degree.

Optionally, the processor 1101 is further configured to obtain pre-stored state information, where the pre-stored state information at least includes current node state information and data result information required for subsequent data processing; and process the received retransmission data according to the pre-stored state information.

Optionally, the receiver 1103 is further configured to receive a signal packet sent by the upstream node, where the signal packet carries a group identifier, and the group identifier is added by the source node to the signal packet after the source node groups and numbers inflowing data; and the processor 1101 is further configured to determine, according to the group identifier carried in the currently received signal packet, whether state information needs to be stored; and when state information needs to be stored, store state information according to a processing result of the retransmission data.

Optionally, the processor 1101 is further configured to obtain a pre-stored group identifier; determine a preset group identifier corresponding to the pre-stored group identifier, where the pre-stored group identifier is a group identifier carried in a previously received signal packet; determine whether the group identifier carried in the currently received signal packet is the same as the preset group identifier corresponding to the pre-stored group identifier; and when the group identifier carried in the currently received signal packet is different from the preset group identifier corresponding to the pre-stored group identifier, determine that state information needs to be stored.

Optionally, the processor 1101 is further configured to: when the retransmission data sent by the upstream node carries a corresponding group identifier, where the group identifier is added by the source node to the retransmission data after the source node groups and numbers the retransmission data, determine, according to the group identifier carried in the retransmission data, whether state information needs to be stored; and when state information needs to be stored, store state information according to a processing result of the retransmission data.

Optionally, the processor 1101 is further configured to obtain a pre-stored group identifier; determine a preset group identifier corresponding to the pre-stored group identifier, where the pre-stored group identifier is a group identifier carried in previously received data; determine whether the group identifier carried in the retransmission data is the same as the preset group identifier corresponding to the pre-stored group identifier; and when the group identifier carried in the retransmission data is different from the preset group identifier corresponding to the pre-stored group identifier, determine that state information needs to be stored.

Optionally, the processor 1101 is further configured to: when it is determined that the working node is not related to the failed node, skip processing the received retransmission data.

Optionally, the receiver 1103 is further configured to receive other data sent by the upstream node, where the other data carries a corresponding group identifier, and the group identifier is added by the source node to the other data after the source node groups and numbers the other data; and the processor 1101 is further configured to obtain a pre-stored group identifier; determine a preset group identifier corresponding to the pre-stored group identifier, where the pre-stored group identifier is a group identifier carried in previously received data; determine whether the group identifier carried in the other data is the same as the preset group identifier corresponding to the pre-stored group identifier; and when the group identifier carried in the other data is different from the preset group identifier corresponding to the pre-stored group identifier, process the other data.

Optionally, the processor 1101 is further configured to obtain a pre-stored group identifier; determine a preset group identifier corresponding to the pre-stored group identifier, where the pre-stored group identifier is a group identifier carried in previously received data; determine whether the group identifier carried in the other data is the same as the preset group identifier corresponding to the pre-stored group identifier; when the group identifier carried in the other data is different from the preset group identifier corresponding to the pre-stored group identifier, determine that state information needs to be stored; and store state information according to a processing result of the other data.

Optionally, the receiver 1103 is further configured to receive a signal packet sent by the upstream node, where the signal packet carries a group identifier, and the group identifier is added by the source node to the signal packet after the source node groups and numbers inflowing data; and the processor 1101 is further configured to obtain a pre-stored group identifier, where the pre-stored group identifier is a group identifier carried in a previously received signal packet; determine whether the group identifier carried in the currently received signal packet is the same as the pre-stored group identifier; and when the group identifier carried in the currently received signal packet is the same as the pre-stored group identifier, process subsequent other data sent by the upstream node.

Optionally, the processor 1101 is further configured to obtain a pre-stored group identifier; determine a preset group identifier corresponding to the pre-stored group identifier, where the pre-stored group identifier is a group identifier carried in a previously received signal packet; determine whether the group identifier carried in the currently received signal packet is the same as the preset group identifier corresponding to the pre-stored group identifier; when the group identifier carried in the currently received signal packet is different from the preset group identifier corresponding to the pre-stored group identifier, determine that state information needs to be stored; and store state information according to a processing result of the other data that is received before the currently received signal packet is received.

The working node provided by this embodiment of the present application receives retransmission data sent by an upstream node, and processes the received retransmission data after determining that the working node is related to a failed node. In this way, the retransmission data sent by the upstream node is processed only when the working node is related to the failed node. Therefore, data processing efficiency of other nodes is not affected, and it is unnecessary to store a large amount of backup data locally, so that local resources are saved. Besides, because frequent interaction with another upstream or downstream node is not required, data processing efficiency is improved.

Figure 12:
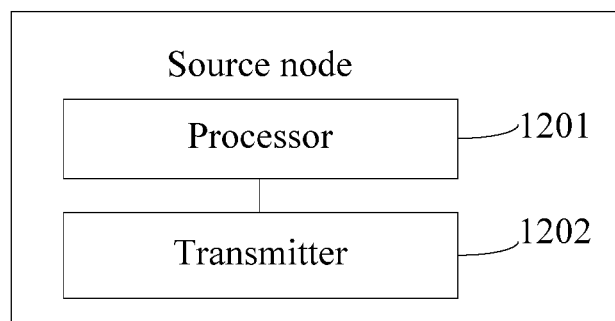
FIG. 12 is a simplified structural diagram of a source node according to an embodiment of the present application.

FIG. 12 shows a schematic structural diagram of a source node according to another embodiment of the present application. The source node is used for executing the functions of the source node in any of the embodiments shown in FIG. 4 to FIG. 7. Referring to FIG. 12, the source node includes at least one processor 1201 and transmitter 1202.

The processor 1201 is configured to obtain node information of a failed node in a distributed stream processing system; and obtain temporarily stored data according to the node information of the failed node;

the transmitter 1202 is configured to send the temporarily stored data as retransmission data to a downstream node, so that the downstream node determines, according to whether the downstream node is related to the failed node, whether to process the retransmission data; and The processor 1201 is further configured to receive the node information of the failed node sent by a centralized management entity, where the centralized management entity is used for monitoring an operating status of each node in the distributed stream processing system.

Optionally, the processor 1201 is further configured to add, to a signal packet, a group identifier corresponding to the retransmission data; and the transmitter 1202 is further configured to send the signal packet carrying the group identifier to a downstream node.

Optionally, the processor 1201 is further configured to use the temporarily stored data as retransmission data, add, to the retransmission data, a group identifier corresponding to the retransmission data, and send the retransmission data carrying the group identifier to a downstream node.

Optionally, the processor 1201 is further configured to group and number received data according to a time interval for receiving data or a data size, to obtain a group identifier corresponding to each piece of data.

The source node provided by this embodiment of the present application receives retransmission data sent by an upstream node, and processes the received retransmission data after determining that the working node is related to a failed node. In this way, the retransmission data sent by the upstream node is processed only when the working node is related to the failed node. Therefore, data processing efficiency of other nodes is not affected, and it is unnecessary to store a large amount of backup data locally, so that local resources are saved. Besides, because frequent interaction with another upstream or downstream node is not required, data processing efficiency is improved.

It should be noted that when the working node and the source node provided in the foregoing embodiments implement the fault tolerance method for a distributed stream processing system, the division of the foregoing functional modules is merely used as an example for description. In an actual application, the foregoing functions may be allocated to different function modules as required, that is, an inner structure of the device is divided into different functional modules, so as to complete all or a part of the functions described above. In addition, the working node, the source node, and the fault tolerance method for a distributed stream processing system provided in the foregoing embodiments are based on a same idea. For a specific implementation process, refer to the method embodiments, which are not described repeatedly herein.

A person of ordinary skill in the art may understand that all or a part of the steps of the embodiments may be implemented by hardware or a program instructing relevant hardware. The program may be stored in a computer readable storage medium. The storage medium may include a read-only memory, a magnetic disk, or an optical disc.

The foregoing descriptions are merely exemplary embodiments of the present application, but are not intended to limit the present application. Any modification, equivalent replacement, and improvement made without departing from the principle of the present application shall fall within the protection scope of the present application.

What is claimed is:

1. A fault tolerance method, comprising:
obtaining, by a working node, information of a failed node in a distributed stream processing system, wherein the information of the failed node comprises identification information of the failed node;
receiving, by the working node, retransmission data sent by an upstream node, wherein the retransmission data is originally sent by a source node to the failed node, and the upstream node is the source node or an upstream working node;
querying, by the working node, a pre-stored node association table for a degree of correlation between the failed node and the working node according to the identification information of the failed node;
determining, by the working node according to the degree of correlation between the failed node and the working node, whether the failed node is related to the working node;
based on a determination that the failed node is related to the working node, processing, by the working node, the received retransmission data, and sending, by the working node, the processed retransmission data to a downstream node; and
based on a determination that the failed node is not related to the working node, skipping processing and sending of the received retransmission data.

2. The method according to claim 1, wherein obtaining the information of the failed node in the distributed stream processing system comprises:
receiving, by the working node, the information of the failed node from a centralized management entity, wherein the centralized management entity monitors an operating status of each node in the distributed stream processing system.

3. The method according to claim 1, wherein the retransmission data sent by the upstream node is grouped by the source node and each group of the retransmission data carries a group identifier, and wherein processing the received retransmission data comprises:
receiving a group of retransmission data;
obtaining pre-stored state information, wherein the pre-stored state information comprises node state information of the working node and a data processing result that were generated in processing a previous data group; and
processing the received group of retransmission data according to the pre-stored state information.

4. The method according to claim 3, wherein after processing the received group of retransmission data according to the pre-stored state information, the method further comprises:
determining, by the working node according to the group identifier carried in the received group of retransmission data, whether the pre-stored state information needs to be updated; and
based on a determination that the pre-stored state information needs to be updated, storing, by the working node, updated state information according to a processing result of the received group of retransmission data.

5. The method according to claim 4, wherein determining, according to the group identifier carried in the received group of retransmission data, whether the pre-stored state information needs to be updated comprises:
   obtaining a pre-stored group identifier, wherein the pre-stored group identifier is a group identifier carried in a previously received data group;
   determining whether the group identifier carried in the received group of retransmission data is the same as the pre-stored group identifier; and
   based on a determination that the group identifier carried in the received group of retransmission data is different from the pre-stored group identifier, determining that the state information needs to be updated.

6. The method according to claim 1, wherein a data flow sent by the upstream node is grouped by the source node and each group of data carries a group identifier, wherein after processing the received retransmission data is skipped, the method further comprises:
   receiving, by the working node, a subsequent group of data sent by the upstream node, wherein the subsequent group of data carries a corresponding group identifier;
   obtaining, by the working node, a pre-stored group identifier, wherein the pre-stored group identifier is a group identifier carried in a previously received data group;
   determining, by the working node, whether the group identifier carried in the subsequent data group is, the same as the pre-stored group identifier; and
   based on a determination that the group identifier carried in the subsequent data group is different from the pre-stored group identifier, processing, by the working node, the subsequent data group.

7. The method according to claim 6, wherein after processing the subsequent data group, the method further comprises:
   updating by the working node, state information according to a processing result of the subsequent data group, wherein the state information comprises node state information of the working node and the processing result of the subsequent data group.

8. The method according to claim 1, wherein a data flow sent by the upstream node is grouped by the source node, and each group of data carries a group identifier, and wherein after processing the received retransmission data is skipped, the method further comprises:
   receiving, by the working node, a data group sent by the upstream node;
   obtaining, by the working node, a pre-stored group identifier, wherein the pre-stored group identifier is a group identifier carried in a previously received data group;
   determining, by the working node, whether the group identifier carried in the currently received data group is the same as the pre-stored group identifier; and
   based on a determination that the group identifier carried in the currently received data group is the same as the pre-stored group identifier, skipping processing the current received data group, and receiving, by the working node, a subsequent data group sent by the upstream node.

9. A working node in a distributed stream processing system, the working node comprising:
   a receiver, configured to receive retransmission data sent by an upstream node, wherein the retransmission data is originally sent by a source node to a failed node, and the upstream node is the source node or an upstream working node;
   a processor, configured to:
      obtain information of a failed node in a distributed stream processing system, wherein the information of the failed node comprises identification information of the failed node;
      query a pre-stored node association table for a degree of correlation between the failed node and the working node according to the identification information of the failed node;
      determine, according to the degree of correlation between the failed node and the working node, whether the working node is related to the failed node;
      based on a determination that the working node is related to the failed node, process the received retransmission data; and
      based on a determination that the working node is not related to the failed node, skip processing and sending of the received retransmission data; and
   a transmitter, configured to send the processed retransmission data to a downstream node.

10. The working node according to claim 9, wherein the receiver is further configured to receive the information of the failed node from a centralized management entity, wherein the centralized management entity monitors an operating status of each node in the distributed stream processing system.

11. The working node according to claim 9, wherein the retransmission data sent by the upstream node is grouped by the source node and each group of the retransmission data carries a group identifier, and wherein in processing the received retransmission data, the processor is configured to:
   obtain a group of retransmission data and pre-stored state information, wherein the pre-stored state information comprises node state information of the working node and a data processing result that were generated in processing a previous data group; and
   process the received group of retransmission data according to the pre-stored state information.

12. The working node according to claim 11, wherein after processing the received group of retransmission data according to the pre-stored state information, the processor is further configured to:
   determine, according to the group identifier carried in the received group of retransmission data, whether the pre-stored state information needs to be updated; and
   based on a determination that the pre-stored state information needs to be updated, store updated state information according to a processing result of the received group of retransmission data.

* * * * *

UNITED STATES PATENT AND TRADEMARK OFFICE
CERTIFICATE OF CORRECTION

| | |
|---|---|
| PATENT NO. | : 10,205,630 B2 |
| APPLICATION NO. | : 15/044077 |
| DATED | : February 12, 2019 |
| INVENTOR(S) | : Pan et al. |

Page 1 of 1

It is certified that error appears in the above-identified patent and that said Letters Patent is hereby corrected as shown below:

On the Title Page

Item (71), in Column 1, in "Applicant", Line 2, delete "CO.,LTD.," and insert -- CO., LTD., --, therefor.

Signed and Sealed this
Twentieth Day of September, 2022

Katherine Kelly Vidal
*Director of the United States Patent and Trademark Office*